(12) United States Patent
Ota et al.

(10) Patent No.: US 11,859,574 B2
(45) Date of Patent: Jan. 2, 2024

(54) METHOD OF CONTROLLING ENGINE, AND ENGINE SYSTEM

(71) Applicant: Mazda Motor Corporation, Hiroshima (JP)

(72) Inventors: Noriyuki Ota, Aki-gun (JP); Yoshihisa Nou, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 135 days.

(21) Appl. No.: 17/452,345

(22) Filed: Oct. 26, 2021

(65) Prior Publication Data

US 2022/0145824 A1 May 12, 2022

(30) Foreign Application Priority Data

Nov. 10, 2020 (JP) .................................. 2020-187351

(51) Int. Cl.
| | | |
|---|---|---|
| F02D 41/40 | (2006.01) | |
| F02F 1/24 | (2006.01) | |
| F02P 3/06 | (2006.01) | |
| F02P 5/15 | (2006.01) | |
| F02D 41/38 | (2006.01) | |

(52) U.S. Cl.
CPC .............. *F02D 41/402* (2013.01); *F02F 1/24* (2013.01); *F02P 3/06* (2013.01); *F02P 5/1502* (2013.01); *F02D 2041/389* (2013.01); *F02F 2001/241* (2013.01)

(58) Field of Classification Search
CPC .. F02D 41/402; F02D 2041/389; F02D 35/02; F02F 1/24; F02F 2001/241; F02P 3/06; F02P 5/1502; F02P 3/08; F02P 3/0442; F02P 15/08; F02P 17/12; F02P 5/045
See application file for complete search history.

(56) References Cited

U.S. PATENT DOCUMENTS

| | | | | |
|---|---|---|---|---|
| 2014/0345565 | A1* | 11/2014 | Mori ........................ | F02P 15/08 |
| | | | | 123/406.12 |
| 2018/0010567 | A1* | 1/2018 | Hirooka ................ | F02P 5/1502 |
| 2018/0038335 | A1* | 2/2018 | Doi ........................ | F02P 3/0435 |
| 2018/0038338 | A1* | 2/2018 | Sugiura ..................... | F02P 5/15 |

(Continued)

FOREIGN PATENT DOCUMENTS

JP          2014145306 A          8/2014

*Primary Examiner* — Kurt Philip Liethen
(74) *Attorney, Agent, or Firm* — Alleman Hall Creasman & Tuttle LLP

(57) ABSTRACT

A method of controlling an engine is provided, which includes the steps of injecting main fuel by a fuel injector during an intake stroke or a compression stroke, providing a mixture gas containing fuel and air inside a cylinder, applying by an ignition device a high voltage between electrodes of a spark plug at a timing when the mixture gas is not ignited, detecting a parameter related to a current value of an electric-discharge channel generated between the electrodes, determining by a controller whether the detected parameter is within a range between a first threshold and a second threshold to determine a flowing state of a vortex inside the cylinder, operating the spark plug to carry out a supplemental ignition when the parameter is determined to be outside the range, and igniting the mixture gas by operation of the spark plug after the supplemental ignition.

20 Claims, 16 Drawing Sheets

(56) References Cited

U.S. PATENT DOCUMENTS

| | | | | |
|---|---|---|---|---|
| 2018/0156182 A1* | 6/2018 | Hattori | ................ | F02D 41/1454 |
| 2018/0238293 A1* | 8/2018 | Sayama | .................... | F02P 3/05 |
| 2018/0291861 A1* | 10/2018 | Hagari | .................... | F02P 5/145 |
| 2018/0298832 A1* | 10/2018 | Hoshi | ................... | F02P 5/1504 |
| 2018/0306135 A1* | 10/2018 | Hayashi | .................. | F02P 15/08 |
| 2018/0372058 A1* | 12/2018 | Hagari | ................. | F02P 3/0442 |
| 2019/0040834 A1* | 2/2019 | Nishio | .................... | F02P 17/12 |
| 2019/0353134 A1* | 11/2019 | Funato | ................... | F02B 31/00 |

* cited by examiner

METHOD OF CONTROLLING ENGINE, AND ENGINE SYSTEM

TECHNICAL FIELD

The present disclosure relates to control of an engine according to a flow inside a cylinder.

BACKGROUND OF THE DISCLOSURE

Increasing combustion speed is beneficial to improve the fuel efficiency of an engine. In an engine provided with spark plugs, each spark plug ignites a mixture gas inside a cylinder to generate a flame around the spark plug. Then, the flame is propagated entirely inside the cylinder while causing a reaction of unburned mixture gas, and the combustion for one cycle finishes. Therefore, in order to accelerate the reaction of the unburned mixture gas to the flame and to increase the combustion speed, it is preferable to increase a contacting area between the flame and the unburned mixture gas, and to generate a strong turbulence. Conventionally, a swirl flow and a tumble flow are generated inside the cylinder in order to accelerate the generation of the turbulence inside the cylinder.

Although it is known that the turbulence is generated when the flow inside the cylinder is crushed (broken) before a piston reaches a top dead center during a compression stroke, the state of the intake flow may vary between cycles. Therefore, conventionally, various methods are examined for estimating the in-cylinder flow.

For example, JP2014-145306A discloses a technology to cause a spark plug provided to a combustion chamber to ignite a plurality of times so as to detect a current value of an electric-discharge channel of the spark plug, and control an ignition timing according to an in-cylinder flow which is estimated based on the detected current value.

Here, the present inventors conducted a diligent study for improving the combustion according to the flow estimated based on the current value of the electric-discharge channel as described in JP2014-145306A. As a result, it became apparent that the state of the in-cylinder flow in a latter half of a compression stroke varies according to a position of the center of a vortex formed inside the cylinder by the intake flow, and this fluctuation in the flowing state may be one factor for combustion variations.

A tumble-vortex component and a swirl-vortex component are combined in the intake flow to form an oblique in-cylinder flow. When the centers of the vortexes exist around the central part of the cylinder in the side vies and the plan view, respectively, the rotating flow is maintained also in the latter half of the compression stroke. As a result, the turbulence becomes uniform or substantially uniform entirely inside the cylinder. In this case, the flame is uniformly or substantially uniformly propagated from around the center toward a peripheral part inside the cylinder.

However, the present inventors found that, when the center of the tumble vortex deviates downward of the cylinder in the side view, the vortex center contacts a top surface of the piston and a lower half of the tumble vortex is broken, which causes the in-cylinder flow to form a forward one-way flow from an intake-valve side to an exhaust-valve side. With the forward one-way flow, the turbulence in an area inside the cylinder on the exhaust-valve side is strong whereas the turbulence in an area on the intake-valve side is weak. In such a case, although the flame is easily propagated toward the exhaust-side area, the propagation toward the intake-side area is difficult.

Moreover, when the center of the tumble vortex deviates upward of the cylinder in the side view, the vortex center contacts a ceiling of the cylinder, and an upper half of the tumble vortex is broken, which causes the in-cylinder flow to form a backward one-way flow from the exhaust-valve side to the intake-valve side. With the backward one-way flow, the turbulence in the intake-side area of the cylinder is strong whereas the turbulence in the exhaust-side area is weak. In such a case, although the flame is easily propagated toward the intake-side area, the propagation toward the exhaust-side area is difficult.

On the other hand, the present inventors found that, when the center of the swirl vortex deviates outward of the cylinder in the plan view, part of the flame under the propagation from the central part toward the peripheral part inside the cylinder is disturbed by the swirl flow deviated from the center of the cylinder, and thus, the propagation of the flame toward a specific area is difficult.

The obstruction of the flame propagation toward the partial area inside the cylinder lowers the combustion speed, and causes combustion variation. Therefore, in order to reduce the combustion variation of the engine, it is necessary to accelerate the flame propagation toward the partial area according to the state of the in-cylinder flow. When the combustion variation of the engine is reduced, fuel efficiency of the engine improves.

SUMMARY OF THE DISCLOSURE

Therefore, the present disclosure is made in view of the above situation, and one purpose thereof is to provide a method of controlling an engine, capable of reducing combustion variation by estimating a state of a flow inside a cylinder and controlling a spark plug according to the flowing state.

As a result of further diligent study to solve the problem, the present inventors found that the position of the vortex inside the cylinder can be estimated by detecting a current value of an electric-discharge channel which is generated between electrodes of a spark plug during an intake stroke or a compression stroke before starting the combustion of the mixture gas, and thus, the flowing state in a latter half of the compression stroke can be estimated.

According to one aspect of the present disclosure, a method of controlling an engine by using a controller is provided. The engine includes a cylinder with a pentroof ceiling, air being introduced into the cylinder through an intake valve provided to the ceiling, an ignition device including a spark plug provided at or near the center axis of the cylinder, and a fuel injector provided at or near the center axis of the cylinder. The method includes the steps of injecting main fuel by the fuel injector during one of an intake stroke and a compression stroke, and providing a mixture gas containing fuel and air inside the cylinder, applying by the ignition device a high voltage between electrodes of the spark plug at a timing when the mixture gas is not ignited, and detecting a parameter related to a current value of an electric-discharge channel generated between the electrodes, determining by the controller whether the detected parameter is within a range between a first threshold and a second threshold to determine a flowing state of a vortex inside the cylinder, operating the spark plug to carry out a supplemental ignition when the parameter is determined to be outside the range, and igniting the mixture gas by operation of the spark plug after the supplemental ignition.

Here, for convenience, a "forward one-way flow" indicates a flow from an intake-valve side to an exhaust-valve side, and a "backward one-way flow" indicates a flow from the exhaust-valve side to the intake-valve side; however, they may be the opposite.

The engine of this configuration includes the cylinder with the pentroof ceiling, the spark plug provided at or near the center axis of the cylinder, and the fuel injector provided at or near the center axis of the cylinder. Since the ceiling is the pentroof type, the intake air introduced into the cylinder forms a tumble vortex, and the intake air introduced into the cylinder through the intake valve also forms a swirl vortex. The flow inside the cylinder becomes oblique with respect to the cylinder axis.

During the intake stroke or the compression stroke, the mixture gas is formed inside the cylinder by the injecting main fuel by the fuel injector, and the ignition device applies the high voltage between the electrodes of the spark plug at the timing when the mixture gas is not ignited, and generates the electric-discharge channel between the electrodes. In the detecting the parameter, the parameter related to the current value of the electric-discharge channel generated at the spark plug is detected. Note that the detecting the parameter may be after or before the main fuel injection.

The electric arc of the discharge channel generated between the electrodes by energy being applied to the spark plug, is extended as the intensity of the flow around the spark plug increases. The extension of the electric-discharge channel increases the resistance between the electrodes, which accelerates a decrease in the voltage applied between the electrodes. As a result, a period of time required for the consumption of the energy applied to the spark plug (i.e., a discharge duration) becomes shorter. The present inventors found that the ignition device can measure the intensity of the flow around the spark plug by detecting the discharge duration of the current as the parameter related to the current value, and can estimate, based on the measured intensity, the center of the vortex inside the cylinder.

In more detail, when the center of the tumble vortex positions around the center of the combustion chamber in a side view, since the center of the tumble vortex separates from the spark plug to a certain extent, the intensity of the flow around the spark plug becomes moderate. In this case, the parameter falls within the range between the first threshold and the second threshold. When the center of the tumble vortex deviates upward in the cylinder, since the center of the tumble vortex is near the spark plug, the intensity of the flow around the spark plug becomes weak (i.e., the flow is slow). In this case, the parameter exceeds the second threshold. When the center of the tumble vortex deviates downward in the cylinder, since the center of the tumble vortex is far from the spark plug, the intensity of the flow around the spark plug becomes strong (i.e., the flow is fast). In this case, the parameter falls below the first threshold. The controller determines whether the detected parameter is below the first threshold or above the second threshold. Accordingly, the controller can estimate, before igniting the mixture gas inside the cylinder, whether the flow is the forward one-way flow or the backward one-way flow and whether an area where the turbulence is weak exists.

Moreover, when the center of the swirl vortex positions around the center of the cylinder in a plan view, the intensity of the flow around the spark plug becomes moderate, and the parameter falls within the range between the first threshold and the second threshold. When the center of the swirl vortex deviates from the center of the cylinder, the intensity of the flow around the spark plug becomes weak and the parameter exceeds the second threshold, and alternatively, the intensity of the flow around the spark plug becomes strong and the parameter falls below the first threshold. The controller determines whether the detected parameter is below the first threshold or above the second threshold so that it can estimate whether an area where the flame is difficult to propagate exists before igniting the mixture gas inside the cylinder.

Moreover, when the parameter is determined to be below the first threshold or above the second threshold, the spark plug operates in the operating the spark plug. The hot plasma generated inside the cylinder due to the electric discharge is carried by the flow to the area where the turbulence is weak or the area where the flame is difficult to propagate (hereinafter, referred to as a "specific area"). Therefore, the temperature of the mixture gas in the specific area can be increased. In the igniting the mixture gas after the supplemental ignition, the spark plug ignites the mixture gas to accelerate the flame propagation toward the specific area, and the flame is uniformly or substantially uniformly propagated entirely inside the cylinder. As a result, the combustion speed increases.

As described above, by the spark plug carrying out the supplemental ignition as needed according to the flowing state inside the cylinder of each cycle, the combustion speed is made to be constant or substantially constant between the cycles, and thus, combustion variation is reduced. The fuel efficiency of this engine improves.

The operating the spark plug may include, when the parameter is determined to be below the first threshold in the determining whether the parameter is within the range, operating the spark plug at a first operation timing, and when the parameter is determined to be above the second threshold, operating the spark plug at a second operation timing retarded from the first operation timing.

When the parameter is determined to be below the first threshold, the tumble vortex flows as the forward one-way flow from the intake-valve side to the exhaust-valve side in the latter half of the compression stroke, and thus, the turbulence on the intake-valve side is not likely be generated. When the parameter is determined to be below the first threshold, by the spark plug carrying out the supplemental ignition at the relatively advanced timing, the hot plasma does not receive high compression pressure inside the cylinder, and rides on the flow of the tumble vortex to be carried from the exhaust-valve side to the intake-valve side area. Thus, the mixture gas on the intake-valve side can be increased in the temperature at the ignition timing.

On the other hand, when the parameter is determined to be above the second threshold, the tumble vortex becomes the backward one-way flow from the exhaust-valve side to the intake-valve side in the latter half of the compression stroke, and thus, the turbulence on the exhaust-valve side is not likely be generated. When the parameter is determined to be above the second threshold, by the spark plug carrying out the supplemental ignition at the relatively retarded timing, the hot plasma receives high compression pressure inside the cylinder, and stays in the central part inside the cylinder when seen in a side view, and then flows toward the exhaust valve where the flow is weak. Thus, the mixture gas on the exhaust-valve side can be increased in the temperature at the ignition timing.

Moreover, when the parameter is determined to be below the first threshold, the center of the swirl vortex deviates toward the intake valve. This is because the maximum flow velocity of the intake flow introduced into the cylinder is comparatively low in the velocity distribution in the radial direction, and a kurtosis of the flow velocity distribution is low. In this case, the flame is difficult to propagate toward the intake-valve side area. When the parameter is determined to be below the first threshold, the spark plug carries out the supplemental ignition at the relatively advanced timing. Accordingly, the hot plasma rides on the flow of the swirl vortex to be carried to the intake-valve side area taking a long time. Thus, the mixture gas near the intake valve can be increased in the temperature at the ignition timing.

On the other hand, when the parameter is determined to be above the second threshold, the center of the swirl vortex deviates toward the exhaust valve. This is because the flow velocity of the intake flow introduced into the cylinder is extremely high near a liner. Also in this case, the flame is difficult to propagate toward the intake-valve side area. When the parameter is determined to be above the second threshold, the spark plug carries out the supplemental ignition at the relatively retarded timing. Accordingly, the hot plasma rides on the fast flow near the liner to be carried to the intake-valve side area quickly. Thus, the mixture gas near the intake valve can be increased in the temperature at the ignition timing.

The applying the high voltage may include detecting the parameter by the ignition device at a timing between an opening of the intake valve and a closing of the intake valve. The determining whether the detected parameter is within the range may include determining by the controller a flowing state of a swirl vortex inside the cylinder based on the parameter.

The oblique flow generated by the tumble flow and the swirl flow can be divided into the tumble vortex and the swirl vortex. The center of the swirl vortex mainly caused by the swirl flow stabilizes in a period during the intake stroke between the opening and the closing of the intake valve. Thus, by the ignition device detecting the parameter in the period between the opening and the closing of the intake valve, the controller can accurately estimate the flowing state including the center of the swirl vortex.

The applying the high voltage may include detecting the parameter by the ignition device after a given time constant passes from the opening of the intake valve.

The intake air easily varies for a certain period from the moment when the intake valve opens. Thus, by not allowing the ignition device to detect the parameter for the certain period, the controller can further accurately estimate the center of the swirl vortex.

The applying the high voltage may include detecting the parameter by the ignition device after the closing of the intake valve. The determining whether the detected parameter is within the range may include determining by the controller a flowing state of a tumble vortex inside the cylinder based on the parameter.

The center of the tumble vortex mainly caused by the tumble flow stabilizes in a period during the compression stroke after the closing of the intake valve. Thus, by the ignition device detecting the parameter after the closing of the intake valve, the controller can accurately estimate the flowing state including the center of the tumble vortex.

The applying the high voltage may include detecting the parameter by the ignition device during the intake stroke and during the compression stroke.

That is, by the ignition device detecting the parameter during both of the intake stroke and the compression stroke, as described above, the controller can estimate the positions of the center of the vortex comprised of the swirl vortex component and the center of the vortex comprised of the tumble vortex component, and thus, the state of the oblique flow inside the cylinder can be estimated accurately.

According to another aspect of the present disclosure, an engine system is provided, which includes an engine and a controller. The engine includes a cylinder with a pentroof ceiling, air being introduced into the cylinder through an intake valve provided to the ceiling, an ignition device including a spark plug provided at or near the center axis of the cylinder, and a fuel injector provided at or near the center axis of the cylinder, and the controller is electrically connected to the ignition device and the fuel injector. The controller includes a processor configured to execute a main fuel injection module to control the fuel injector to inject main fuel during one of an intake stroke and a compression stroke, and provide a mixture gas containing fuel and air inside the cylinder, a determination module to control the ignition device to apply a high voltage between electrodes of the spark plug at a timing when the mixture gas is not ignited, and detect a parameter related to a current value of an electric-discharge channel generated between the electrodes, and to determine whether the parameter detected by the ignition device is within a range between a first threshold and a second threshold to determine a flowing state of a vortex inside the cylinder, a supplemental ignition control module to control the ignition device to operate the spark plug when the determination module determines that the parameter is outside the range, and a main ignition control module to control the ignition device to ignite the mixture gas by the spark plug after the supplemental ignition control module operates the spark plug.

Such an engine system is based on the knowledge of the present inventors that the center of the vortex inside the cylinder can be estimated when the ignition device detects the parameter related to the current value of the electric-discharge channel generated between the electrodes of the spark plug, as described above.

The controller causes the spark plug to carry out the supplemental ignition as needed according to the estimated center of the vortex, before the main ignition. Thus, the mixture gas in the specific area can be increased in the temperature in the latter half of the compression stroke.

The controller then controls the ignition device so that the spark plug ignites the mixture gas, which increases the combustion speed in the area where the temperature of the mixture gas is high.

As described above, by carrying out the supplemental ignition as needed in each cycle, the combustion speed is made to be constant or substantially constant between the cycles, and thus, combustion variation is reduced.

When the determination module determines that the parameter is below the first threshold, the spark plug may operate at a first operation timing, and when the determination module determines that the parameter is above the second threshold, the spark plug may operate at a second operation timing retarded from the first operation timing.

By changing the timing of the supplemental ignition based on the magnitude relationship between the parameter, and the first threshold and the second threshold, the mixture gas at the high temperature can be positioned in the specific area.

The ignition device may detect the parameter at a timing between an opening of the intake valve and a closing of the intake valve. The controller may determine a flowing state of a swirl vortex inside the cylinder based on the parameter.

As described above, by the ignition device detecting the parameter during the intake stroke between the opening and the closing of the intake valve, the controller can accurately estimate the center of the swirl vortex.

The ignition device may detect the parameter after a given time constant passes from the opening of the intake valve.

As described above, the intake air easily varies for a certain period from the moment when the intake valve opens. Thus, by not allowing the ignition device to detect the parameter for the certain period, the controller can further accurately estimate the center of the vortex of the swirl vortex.

The ignition device may detect the parameter after the closing of the intake valve. The controller may determine a flowing state of a tumble vortex inside the cylinder based on the parameter.

As described above, by the ignition device detecting the parameter during the compression stroke after the closing of the intake valve, the controller can accurately estimate the center of the tumble vortex.

The ignition device may detect the parameter during the intake stroke and during the compression stroke.

As described above, by the ignition device detecting the parameter during both of the intake stroke and the compression stroke, the controller can estimate the positions of the center of the vortex comprised of the swirl vortex component and the center of the vortex comprised of the tumble vortex component, and thus, the state of the oblique flow inside the cylinder can be estimated accurately.

According to still another aspect of the present disclosure, an engine system is provided, which includes an engine and a controller. The engine is mounted on an automobile and includes a cylinder with a pentroof ceiling, air being introduced into the cylinder through an intake valve provided to the ceiling, an ignition device including a spark plug provided at or near the center axis of the cylinder, and a fuel injector provided at or near the center axis of the cylinder. The controller is electrically connected to the ignition device and the fuel injector. The controller includes a processor configured to execute a main fuel injection module to control the fuel injector to inject main fuel during one of an intake stroke and a compression stroke, and provide a mixture gas containing fuel and air inside the cylinder, a determination module to control the ignition device to apply a high voltage between electrodes of the spark plug at a timing when the mixture gas is not ignited, and detect a parameter related to a current value of an electric-discharge channel generated between the electrodes, and to determine whether the parameter detected by the ignition device is within a range between a first threshold and a second threshold so as to determine a flowing state of a vortex inside the cylinder, a supplemental ignition control module to control the ignition device to operate the spark plug when the determination module determines that the parameter is outside the range, and a main ignition control module to control the ignition device to ignite the mixture gas by the spark plug after the supplemental ignition control module operates the spark plug.

The fuel of the engine may be gasoline.

DETAILED DESCRIPTION OF THE DISCLOSURE

Hereinafter, one embodiment of a method of controlling an engine, and an engine system is described with reference to the accompanying drawings. The engine, the engine system, and the engine control method described herein are merely illustration.

Figure 1:
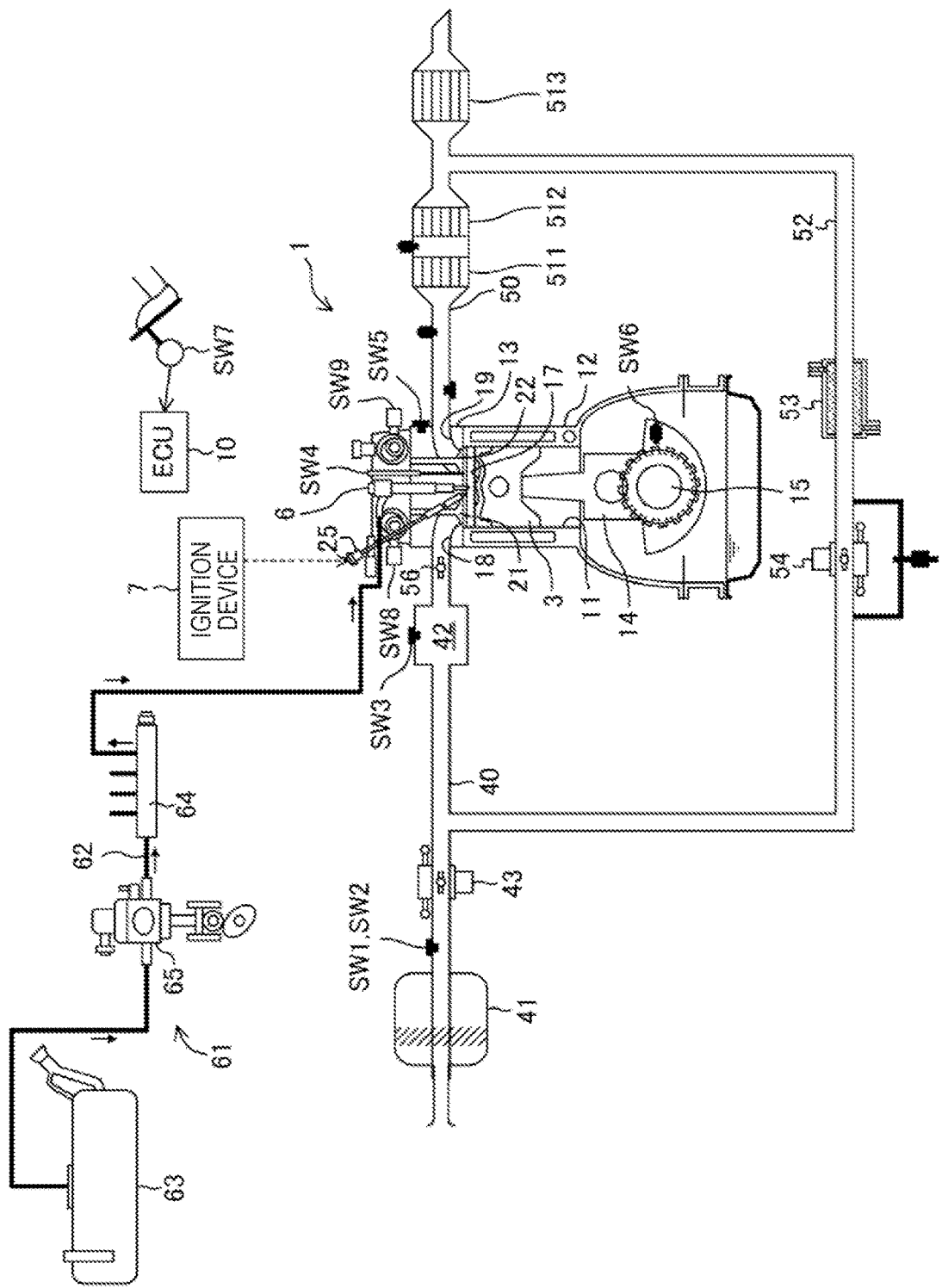
FIG. 1 is a view illustrating an engine system.
Figure 2:
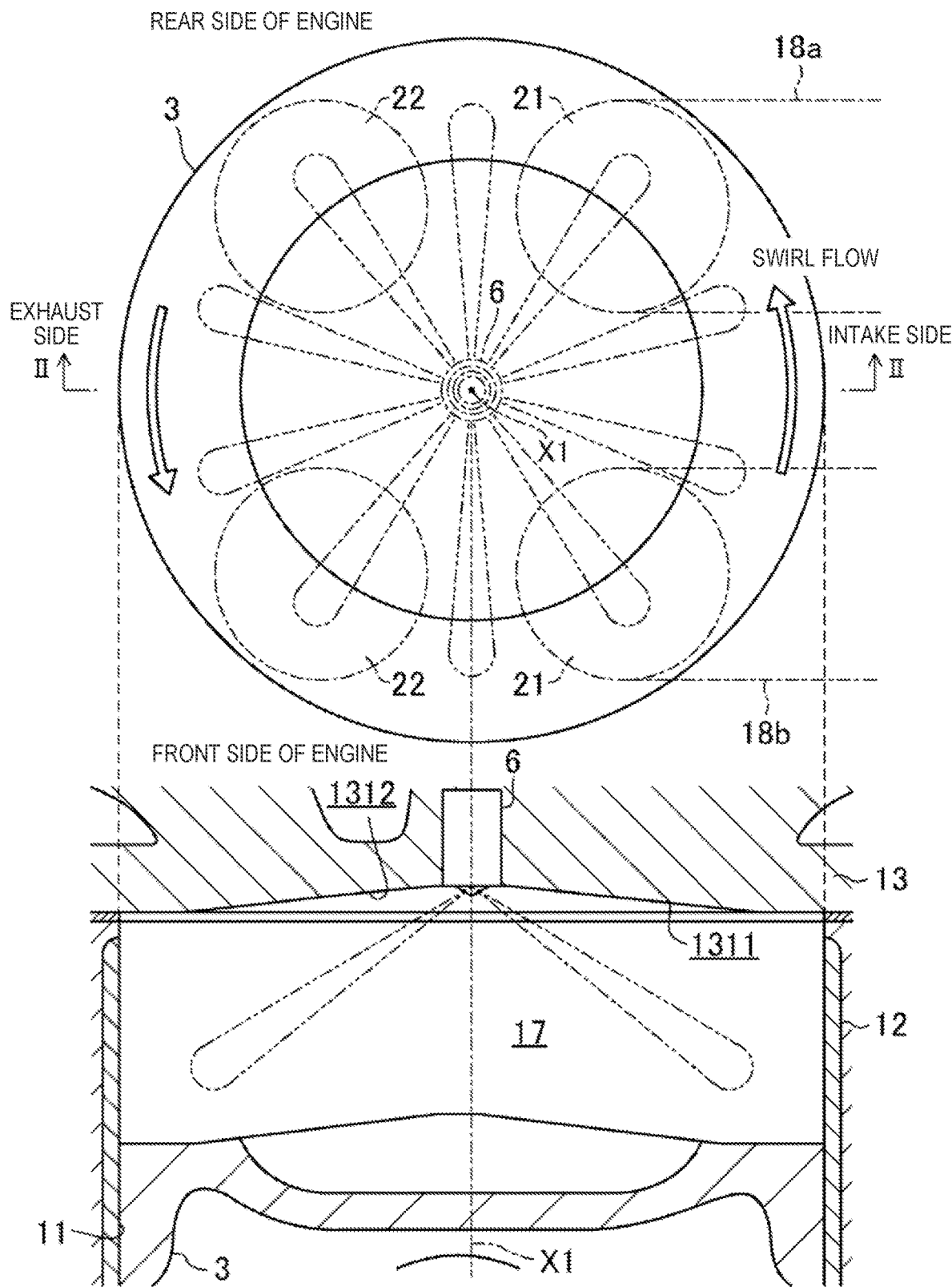
FIG. 2 is a view illustrating a configuration of a combustion chamber of the engine, where an upper part of this figure is a plan view of the combustion chamber and a lower part of this figure is a cross-sectional view taken along a line II-II in the upper part.
Figure 3:
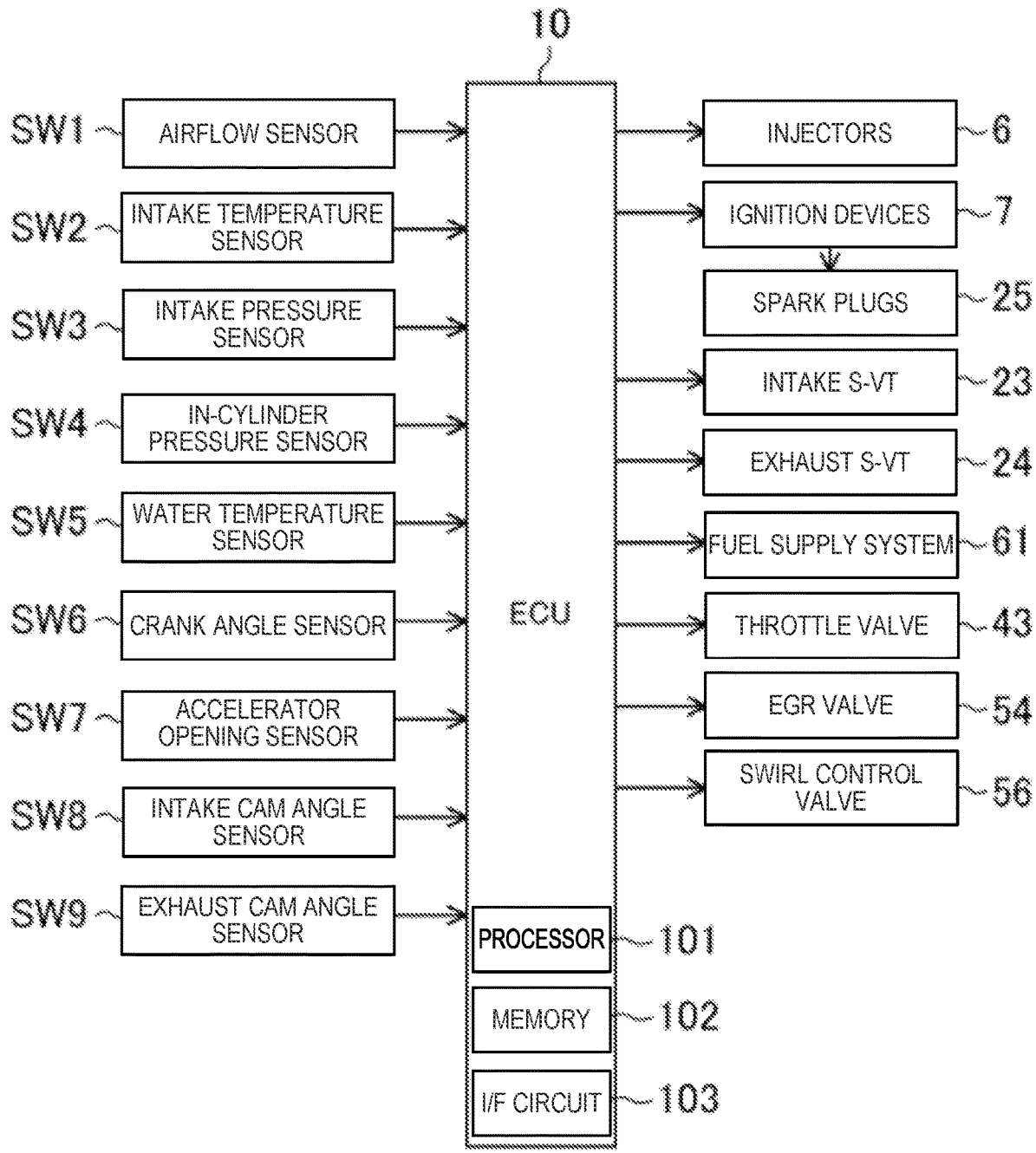
FIG. 3 is a block diagram of the engine system.

FIG. 1 is a view illustrating the engine system. FIG. 2 is a view illustrating a configuration of a combustion chamber of the engine. An intake side and an exhaust side illustrated in FIG. 1 are opposite from the intake side and the exhaust side illustrated in FIG. 2. FIG. 3 is a block diagram illustrating a control device for the engine.

The engine system includes an engine 1. The engine 1 includes cylinders 11, and is a four-stroke engine in which an intake stroke, a compression stroke, an expansion stroke, and an exhaust stroke are repeated in each cylinder 11. The engine 1 is mounted on a four-wheeled automobile, and the automobile travels according to the operation of the engine 1. Fuel of the engine 1 is gasoline in this example.

(Configuration of Engine)

The engine 1 is provided with a cylinder block 12 and a cylinder head 13. The cylinder head 13 is placed on the cylinder block 12. A plurality of cylinders 11 are formed inside the cylinder block 12. The engine 1 is a multi-cylinder engine. In FIG. 1, only one cylinder 11 is illustrated.

A piston 3 is inserted into each cylinder 11. The piston 3 is coupled to a crankshaft 15 through a connecting rod 14.

The piston 3 reciprocates inside the cylinder 11. The piston 3, the cylinder 11, and the cylinder head 13 define a combustion chamber 17.

As illustrated in the lower part of FIG. 2, a lower surface of the cylinder head 13 (i.e., a ceiling of the cylinder 11) is constituted by a sloped surface 1311 and a sloped surface 1312. The sloped surface 1311 is a slope on a side of an intake valve 21 (described later), and inclines upwardly toward a central part of the ceiling of the cylinder 11. The sloped surface 1312 is a slope on a side of an exhaust valve 22 (described later), and inclines upwardly toward the central part of the ceiling of the cylinder 11. The ceiling of the cylinder 11 is a so-called pentroof type.

The cylinder head 13 is formed with intake ports 18 for the cylinders 11 such that each intake port 18 communicates with the inside of the corresponding cylinder 11. Although detailed illustration is omitted, the intake port 18 is a so-called tumble port. That is, the intake port 18 has a shape which generates a tumble flow inside the cylinder 11. The pentroof ceiling of the cylinder 11 and the tumble port generate the tumble flow inside the cylinder 11.

Each intake port 18 is provided with the intake valve 21. The intake valve 21 opens and closes the intake port 18. A valve operating mechanism opens and closes the intake valve 21 at a given timing. The valve operating mechanism may be a variable valve operating mechanism which varies a valve timing and/or a valve lift. As illustrated in FIG. 3, the valve operating mechanism includes an intake S-VT (Sequential-Valve Timing) 23 of an electric type or a hydraulic type. The intake S-VT 23 continuously changes a rotational phase of an intake camshaft within a given angle range. A valve opening period of the intake valve 21 does not change.

The cylinder head 13 is formed with exhaust ports 19 for the cylinders 11 such that each exhaust port 19 communicates with the inside of the corresponding cylinder 11.

Each exhaust port 19 is provided with the exhaust valve 22. The exhaust valve 22 opens and closes the exhaust port 19. A valve operating mechanism opens and closes the exhaust valve 22 at a given timing. The valve operating mechanism may be a variable valve operating mechanism which varies a valve timing and/or a valve lift. As illustrated in FIG. 3, the valve operating mechanism includes an exhaust S-VT 24 of an electric type or a hydraulic type. The exhaust S-VT 24 continuously changes a rotational phase of an exhaust camshaft within a given angle range. A valve opening period of the exhaust valve 22 does not change.

Injectors 6 are attached to the cylinder head 13 for the respective cylinders 11. As illustrated in FIG. 2, each injector 6 is provided to the central part of the cylinder 11 in the plan view (at or near a center axis X1 of the cylinder). In detail, the injector 6 is disposed in a valley part of the pentroof where the sloped surface 1311 and the sloped surface 1312 intersect with each other.

The injector 6 directly injects fuel into the cylinder 11. The injector 6 is one example of a fuel injector, and is of a multiple nozzle hole type having a plurality of nozzle holes (not illustrated in detail). As illustrated by two-dot chain lines in FIG. 2, the injector 6 injects fuel radially outwardly from the central part to a peripheral part of the cylinder 11. Although, in this example, the injector 6 has ten nozzle holes which are circumferentially disposed at an equal angle, the number of nozzle holes and the positions thereof are not particularly limited to this configuration.

The injector 6 is connected to a fuel supply system 61. The fuel supply system 61 is comprised of a fuel tank 63 which stores fuel, and a fuel supply passage 62 which couples the fuel tank 63 to the injector 6. A fuel pump 65 and a common rail 64 are interposed in the fuel supply passage 62. The fuel pump 65 pumps fuel to the common rail 64. The fuel pump 65 is a plunger-type pump driven by the crankshaft 15 in this example. The common rail 64 stores at a high fuel pressure the fuel pumped from the fuel pump 65. When the injector 6 is valve-opened, the fuel stored in the common rail 64 is injected into the cylinder 11 from the nozzle holes of the injector 6. The pressure of the fuel supplied to the injector 6 may be changed according to the operating state of the engine 1. Note that the configuration of the fuel supply system 61 is not limited to the configuration described above.

Spark plugs 25 are attached to the cylinder head 13 for the respective cylinders 11. Each spark plug 25 forcibly ignites a mixture gas inside the cylinder 11. Although detailed illustration is omitted, a center electrode and a ground electrode of the spark plug 25 are positioned at the central part of the cylinder 11 in the plan view, near the ceiling.

As illustrated in FIGS. 1 and 3, the spark plug 25 is electrically connected to an ignition device 7. The ignition device 7 applies voltage between the electrodes of the spark plug 25 to cause an electric discharge (arc discharge) so as to ignite the mixture gas inside the cylinder 11. The ignition device 7 also causes the spark plug 25 to discharge the electricity when the mixture gas is not ignited, and detects a parameter related to a current value of an electric-discharge channel, which is generated between the electrodes in the electric discharge (details will be described later). The detected parameter is used to estimate a state of flow inside the cylinder 11. The configuration of the ignition device 7 will be described later.

The engine 1 is connected at one side to an intake passage 40. The intake passage 40 communicates with the intake ports 18 of the cylinders 11. Air to be introduced into the cylinders 11 flows through the intake passage 40. The intake passage 40 is provided at its upstream-end part with an air cleaner 41. The air cleaner 41 filters the air. The intake passage 40 is provided, near its downstream end, with a surge tank 42. A part of the intake passage 40 downstream of the surge tank 42 constitutes independent passages branching for the respective cylinders 11. Downstream ends of the independent passages are connected to the intake ports 18 of the cylinders 11, respectively.

The intake passage 40 is provided, between the air cleaner 41 and the surge tank 42, with a throttle valve 43. The throttle valve 43 adjusts the opening of the valve to control an amount of air to be introduced into the cylinder 11.

The engine 1 is provided with a swirl generator which generates a swirl flow inside the cylinders 11. Although detailed illustration is omitted, the swirl generator has a swirl control valve 56 attached to the intake passage 40. The intake passage 40 includes a first intake passage 18a and a second intake passage 18b (see FIG. 2) which are parallelly provided downstream of the surge tank 42, and the swirl control valve 56 is provided to the second intake passage 18b. The swirl control valve 56 is an opening control valve which is capable of choking a cross-section of the second intake passage 18b. When the opening of the swirl control valve 56 is small, a flow rate of the intake air flowing into the cylinder 11 from the first intake passage 18a is relatively large, and a flow rate of the intake air flowing into the cylinder 11 from the second intake passage 18b is relatively small, which increases the swirl flow inside the cylinder 11. On the other hand, when the opening of the swirl control valve 56 is large, the flow rate of the intake air flowing into the cylinder 11 from the first intake passage 18a and the flow rate of the intake air flowing from the second intake passage 18b are substantially equal, which reduces the swirl flow inside the cylinder 11. When the swirl control valve 56 is fully opened, the swirl flow is not generated. Note that as illustrated by white arrows in FIG. 2, the swirl flow circles in the counterclockwise direction.

Note that instead of generating the swirl flow by the swirl control valve 56, the intake port 18 of the engine 1 may be configured to be a helical port capable of generating the swirl flow.

The engine 1 is connected at the other side to an exhaust passage 50. The exhaust passage 50 communicates with the exhaust ports 19 of the cylinders 11. The exhaust passage 50 is a passage through which exhaust gas discharged from the cylinders 11 flows. Although detailed illustration is omitted, an upstream part of the exhaust passage 50 constitutes independent passages branching for the respective cylinders 11. Upstream ends of the independent passages are connected to the exhaust ports 19 of the cylinders 11, respectively.

The exhaust passage 50 is provided with an exhaust gas purification system having a plurality of catalytic converters. An upstream catalytic converter includes a three-way catalyst 511 and a GPF (Gasoline Particulate Filter) 512. A downstream catalytic converter includes a three-way catalyst 513. Note that the exhaust gas purification system is not limited to the illustrated configuration. For example, the GPF may be omitted. Moreover, the catalytic converter is not limited to the one including the three-way catalyst. Further, the disposed order of the three-way catalyst and the GPF may be changed suitably.

An exhaust gas recirculation (EGR) passage 52 is connected between the intake passage 40 and the exhaust passage 50. The EGR passage 52 is a passage through which a part of exhaust gas recirculates to the intake passage 40. An upstream end of the EGR passage 52 is connected to a part of the exhaust passage 50 between the upstream and downstream catalytic converters. A downstream end of the EGR passage 52 is connected to a part of the intake passage 40 between the throttle valve 43 and the surge tank 42.

The EGR passage 52 is provided with an EGR cooler 53 of a water-cooled type. The EGR cooler 53 cools exhaust gas. The EGR passage 52 is also provided with an EGR valve 54. The EGR valve 54 controls a flow rate of exhaust gas flowing through the EGR passage 52. The EGR valve 54 changes its opening to control a recirculating amount of the cooled exhaust gas.

As illustrated in FIG. 3, the control device for the engine 1 is provided with an ECU (Engine Control Unit) 10 to operate the engine 1. The ECU 10 is a controller based on a well-known microcomputer, and includes a processor (e.g., a central processing unit (CPU)) 101 which executes a program, memory 102 which is comprised of, for example, RAM (Random Access Memory) and ROM (Read Only Memory), and stores the program and data, and an interface (I/F) circuit 103 which inputs and outputs an electric signal. The ECU 10 is one example of a "controller."

As illustrated in FIGS. 1 and 3, various kinds of sensors SW1-SW9 are connected to the ECU 10. The sensors SW1-SW9 output signals to the ECU 10. The sensors include the following sensors. An airflow sensor SW1 is provided to the intake passage 40 downstream of the air cleaner 41, and measures the flow rate of air flowing through the intake passage 40. An intake temperature sensor SW2 is provided to the intake passage 40 downstream of the air cleaner 41, and measures the temperature of the air flowing through the intake passage 40. An intake pressure sensor SW3 is attached to the surge tank 42, and measures the pressure of the air to be introduced into the cylinder 11. An in-cylinder pressure sensor SW4 is attached to the cylinder head 13 for each cylinder 11, and measures the pressure inside the cylinder 11. A water temperature sensor SW5 is attached to the engine 1, and measures the temperature of coolant. A crank angle sensor SW6 is attached to the engine 1, and measures a rotational angle of the crankshaft 15. An accelerator opening sensor SW7 is attached to an accelerator pedal mechanism, and measures an accelerator opening corresponding to an operation amount of an accelerator pedal. An intake cam angle sensor SW8 is attached to the engine 1, and measures a rotational angle of the intake camshaft. An exhaust cam angle sensor SW9 is attached to the engine 1, and measures a rotational angle of the exhaust camshaft.

The ECU 10 determines the operating state of the engine 1 based on the signals of the sensors SW1-SW9, and also calculates a control amount of each device based on a given control logic stored in the memory 102. The control logic includes calculating a target amount and/or the control amount by using a map stored in the memory 102.

The ECU 10 outputs electric signals related to the calculated control amounts to the injectors 6, the spark plugs 25, the intake S-VT 23, the exhaust S-VT 24, the fuel supply system 61, the throttle valve 43, the EGR valve 54, and the swirl control valve 56.

The ECU 10 electrically connected to the various sensors and devices constitutes a plurality of functional blocks to operate the engine 1, which will be described later.

(Configuration of Ignition Device)

Figure 4:
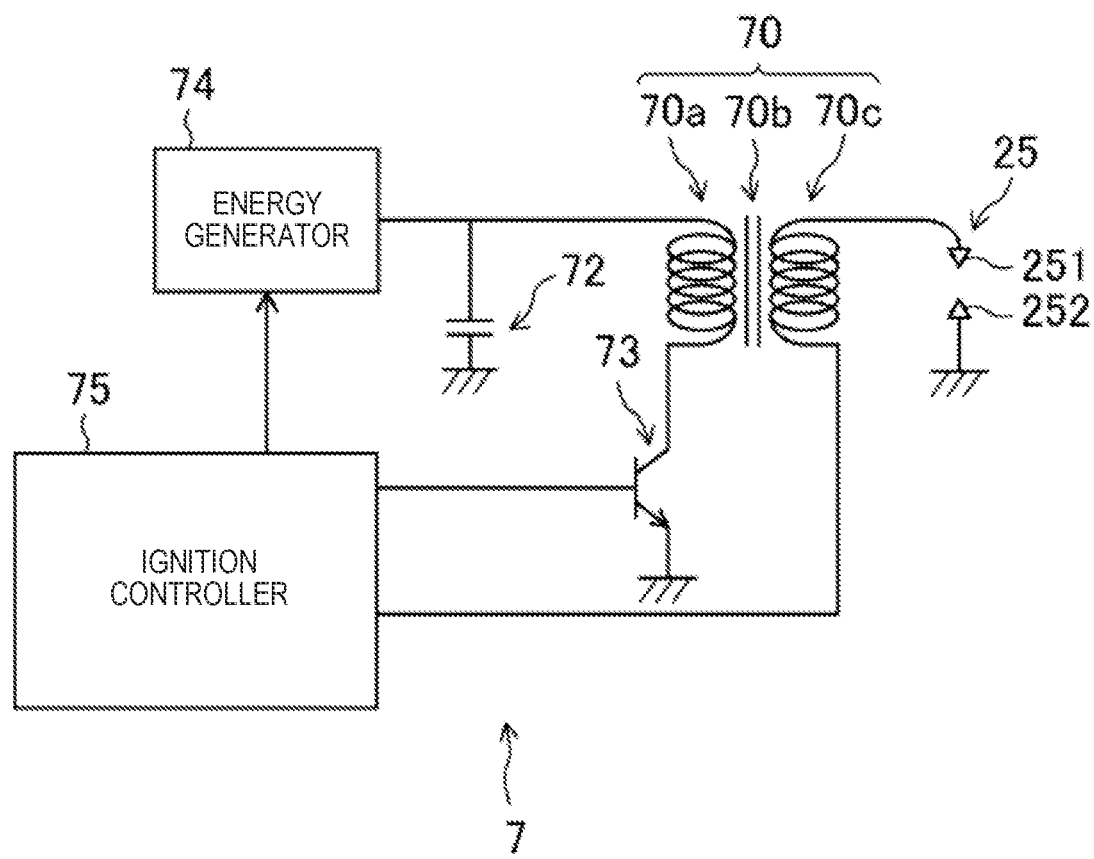
FIG. 4 is a view illustrating an ignition device.

FIG. 4 illustrates a configuration of the ignition device 7. The ignition device 7 applies voltage between a center electrode 251 and a ground electrode 252 of the spark plug 25 so as to cause the electric discharge inside the cylinder 11. The ignition device 7 includes an ignition coil 70 having a primary coil 70a, a secondary coil 70c, and an iron core 70b. The ignition device 7 is also provided with a capacitor 72, a transistor 73, an energy generator 74, and an ignition controller 75.

The center electrode 251 is connected to the secondary coil 70c of the ignition coil 70, and the ground electrode 252 is connected to the ground. When a secondary voltage applied between the electrodes by the secondary coil 70c reaches a voltage required for electrical breakdown, the electric discharge occurs at a gap between the center electrode 251 and the ground electrode 252.

One end of the primary coil 70a is connected to the capacitor 72. The capacitor 72 stores electrical energy to supply a primary current to the primary coil 70a. The energy generator 74 includes a power source, and charges the capacitor 72.

The other end of the primary coil 70a is connected to a collector of the transistor 73. The transistor 73 switches between supplying or not supplying the primary current to the ignition coil 70.

As described above, one end of the secondary coil 70c is connected to the center electrode 251, and the other end is connected to the ignition controller 75.

The ignition controller 75 controls the energy generator 74 and the transistor 73 so that the spark plug 25 ignites the mixture gas inside the cylinder 11 at a given timing.

Moreover, the ignition controller 75 can measure the secondary voltage applied between the electrodes of the spark plug 25 by the secondary coil 70c, and a secondary current flown from the secondary coil 70c to the spark plug 25. As described above, the ignition device 7 causes the spark plug 25 to discharge the electricity when the mixture gas is not ignited, and detects the parameter related to the current value at the time of the electric discharge.

(Operation Control for Engine)

Next, operation control for the engine 1 by the ECU 10 is described. The engine 1 is a spark-ignition engine. The injector 6 injects fuel into the cylinder 11 during an intake stroke or a compression stroke by an amount corresponding to the operating state of the engine 1 to form mixture gas inside the cylinder 11, and the spark plug 25 ignites the mixture gas at a given timing near a compression top dead center (TDC) to combust the mixture gas.

The engine 1 generates a turbulence inside the cylinder 11 to improve fuel efficiency. When the turbulence is generated inside the cylinder 11, combustion speed increases. In detail, the engine 1 is provided with the cylinder 11 with the pentroof ceiling, and the intake port 18 of the tumble-port type. The intake air introduced into the cylinder 11 generates a tumble flow. The engine 1 also includes the swirl control valve 56. When the swirl control valve 56 is closed, the intake air introduced into the cylinder 11 generates a swirl flow. By the tumble flow and the swirl flow being combined together, an oblique flow in which a tumble vortex and a swirl vortex are combined, is generated inside the cylinder 11.

Here, the state of the intake flow inside the cylinder 11 is not the same in every cycle, but may vary depending on various factors. The change in the state of the intake flow may lead to the change in the combustion speed. When the combustion speed varies between cycles, combustion variation of the engine 1 may be caused. The engine system and the method of controlling the engine 1 disclosed herein reduce the combustion variation of the engine 1 by reducing the variations in the combustion speed between the cycles.

In more detail, in this engine system, the state of the flow inside the cylinder 11 is estimated every cycle, as well as the spark plug 25 operating inside the cylinder 11 (performing a supplemental ignition) as needed based on the estimated flowing state.

Figure 5:
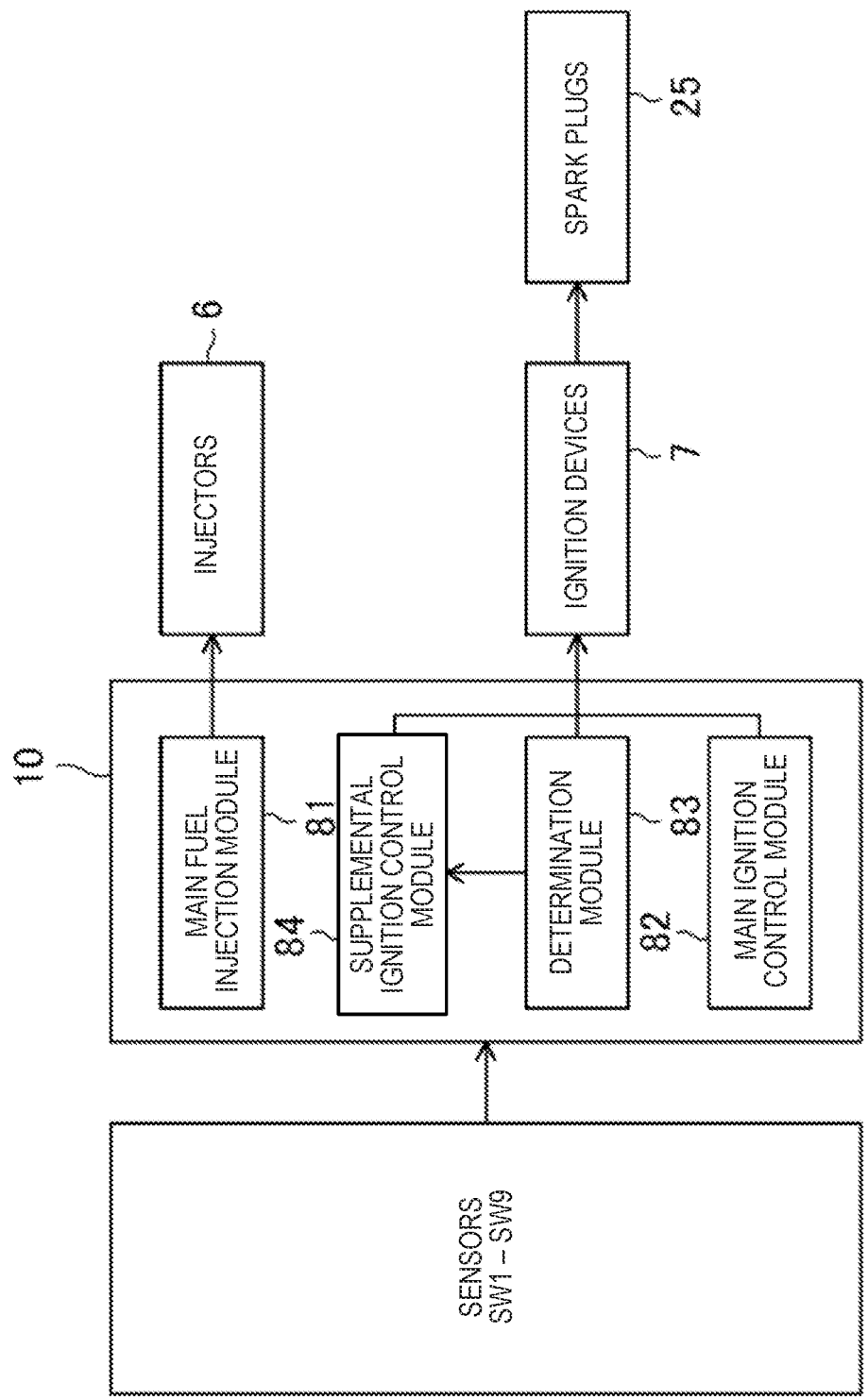
FIG. 5 is a block diagram illustrating functional blocks related to control of the engine.

FIG. 5 is a block diagram illustrating a configuration of the control device for the engine 1, which executes the control for reducing the combustion variation. FIG. 5 illustrates functional blocks of the ECU 10. The ECU 10 includes a main fuel injection module 81 and a main ignition control module 82 executed by the processor 101 to perform their respective functions. These modules are stored in the memory 102 as software modules. The main fuel injection module 81 sets an injection amount and an injection timing of main fuel corresponding to a demanded torque of the engine 1, and causes the injector 6 to inject the main fuel. The main ignition control module 82 causes the spark plug 25 to ignite the mixture gas inside the cylinder 11 at a given timing (i.e., a main ignition) after the injection of the main fuel.

The ECU 10 also includes a determination module 83 and a supplemental ignition control module 84. As will be described later, the determination module 83 determines the flowing state inside the cylinder 11 based on the parameters detected by using the ignition device 7 and the spark plug 25. The supplemental ignition control module 84 causes the spark plug 25 to carry out electric discharge inside the cylinder as needed before the main ignition of the mixture gas, based on the flowing state inside the cylinder 11 determined by the determination module 83, and generates a hot plasma.

Below, the estimation of the flowing state inside the cylinder 11, which is executed by the engine control device illustrated in FIG. 5, is described. Then, injection control of the supplemental ignition based on the estimated flowing state is described.

(Estimation of Flowing State)

Figure 6:
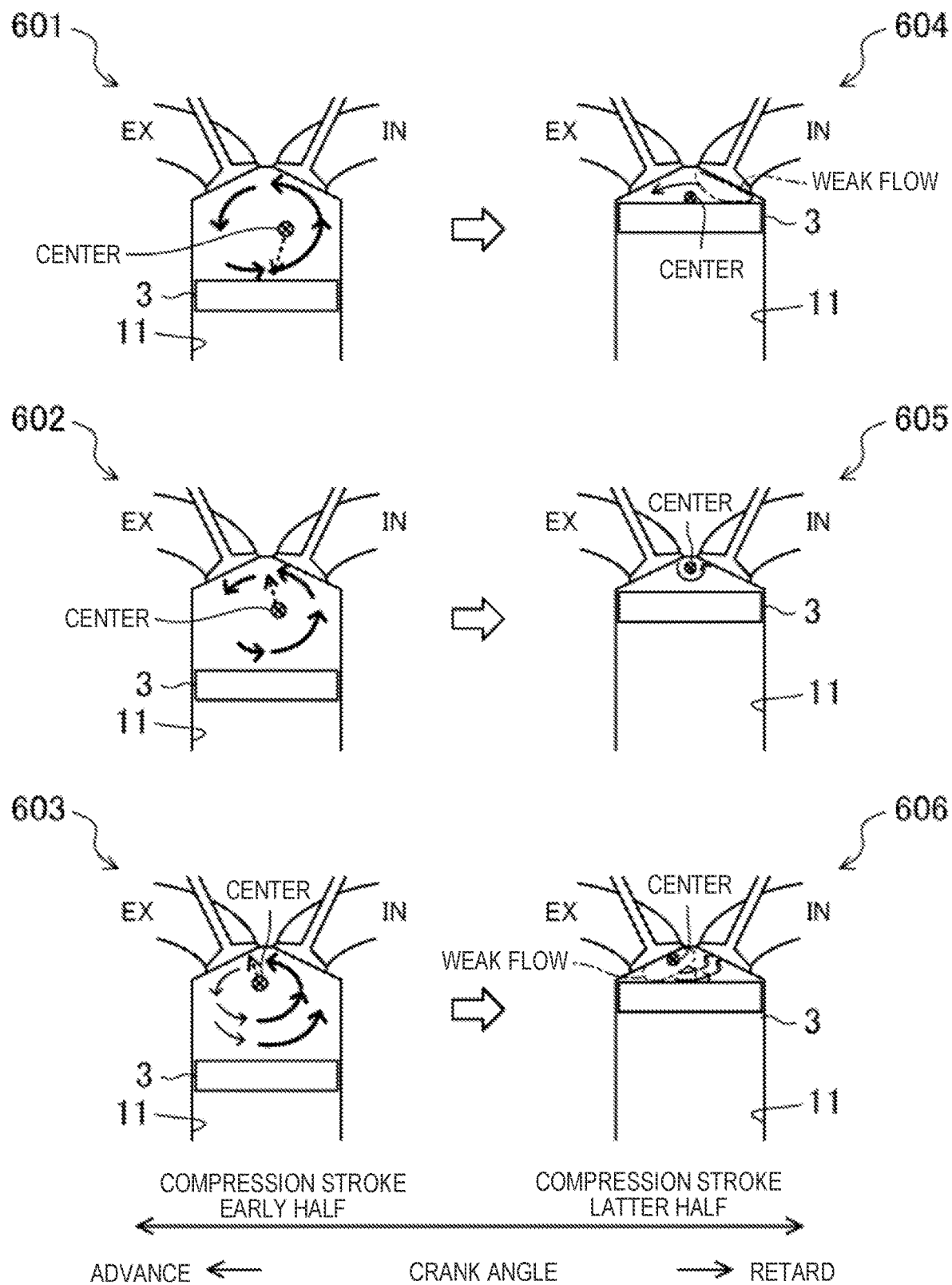
FIG. 6 is a view illustrating the center of a tumble vortex and a state of flow inside a cylinder in a latter half of a compression stroke.

FIG. 6 is a view illustrating the center of the tumble vortex in an early half of a compression stroke and the flowing state inside the cylinder 11 in a latter half of the compression stroke. Chart 601 in FIG. 6 illustrates the flowing state inside the cylinder 11 in the early half of the compression stroke, where the center of the tumble vortex is near the piston 3 inside the cylinder 11. Chart 604 illustrates the flowing state inside the cylinder 11 in the latter half of the compression stroke, in which the crank angle progressed from the state of chart 601.

Similarly, chart 602 illustrates the flowing state inside the cylinder 11 in the early half of the compression stroke, where the center of the tumble vortex is at the middle between the piston 3 and the ceiling inside the cylinder 11. Chart 605 illustrates the flowing state inside the cylinder 11 in the latter half of the compression stroke, in which the crank angle progressed from the state of chart 602.

Moreover, chart 603 illustrates the flowing state inside the cylinder 11 in the early half of the compression stroke, where the center of the tumble vortex is near the ceiling inside the cylinder 11. Chart 606 illustrates the flowing state inside the cylinder 11 in the latter half of the compression stroke, in which the crank angle progressed from the state of chart 603.

Note that the early half and the latter half of the compression stroke correspond to the early half and the latter half when the compression stroke is equally divided, respectively.

First, as illustrated in chart 602, when the center of the tumble vortex inside the cylinder 11 is located around the center of the combustion chamber 17 in the side view, the rotating flow is maintained also in the latter half of the compression stroke as indicated by a solid arrow in chart 605. As a result, the turbulence is uniform or substantially uniform entirely inside the cylinder. In this case, the flame is uniformly or substantially uniformly propagated from around the center toward the peripheral part inside the cylinder 11. Since the propagation of the flame is accelerated by the turbulence inside the cylinder 11, the combustion speed is comparatively high.

As illustrated in chart 601, when the center of the tumble vortex deviates downward inside the cylinder 11 in the side view, the vortex center contacts the top surface of the piston 3 and a lower half of the tumble vortex is broken in the latter half of the compression stroke as illustrated in chart 604. Accordingly, as indicated by an arrow in chart 604, the flow inside the cylinder 11 becomes a one-way flow from the intake valve 21 toward the exhaust valve 22. Hereinafter, this one-way flow is referred to as a "forward one-way flow." When the flow inside the cylinder 11 is the forward one-way flow, the turbulence inside the cylinder 11 is uneven. In detail, while the turbulence in an area on the exhaust-valve side is strong, the turbulence in an area on the intake-valve side (the area surrounded by a one-dot chain line in chart 604) is weak. In such a case, although the flame generated by the ignition of the mixture gas at the central part of the cylinder 11 is easily propagated to the exhaust-side area, the propagation toward the intake-side area is difficult. The combustion speed in the case of chart 604 is lower than the case of chart 605.

As illustrated in chart 603, when the center of the tumble vortex deviates upward inside the cylinder 11 in the side view, the vortex center contacts the ceiling of the cylinder 11 and an upper half of the tumble vortex is broken in the latter half of the compression stroke as illustrated in chart 606. Accordingly, as indicated by arrows in chart 606, the flow inside the cylinder 11 becomes a one-way flow from the exhaust valve 22 toward the intake valve 21. Hereinafter, this one-way flow is referred to as a "backward one-way flow." When the flow inside the cylinder 11 is the backward one-way flow, the turbulence inside the cylinder 11 is uneven. In detail, while the turbulence in the area on the intake-valve side is strong, the turbulence in the area on the exhaust-valve side (the area surrounded by a one-dot chain line in chart 606) is weak. In such a case, although the flame is easily propagated toward the intake-side area, the propagation toward the exhaust-side area is difficult. The combustion speed in the case of chart 606 is lower than the case of chart 605.

In the engine system, the ignition device 7 detects the flowing state inside the cylinder 11. In detail, the ignition device 7 causes the electric discharge inside the cylinder 11 at a timing when the mixture gas is not ignited, and detects a period of time for which the electric discharge continues (discharge duration). The determination module 83 estimates the intensity of the flow around the spark plug 25 based on the detected discharge duration, and determines the center of the tumble vortex based on the estimated flow intensity.

Figure 7:
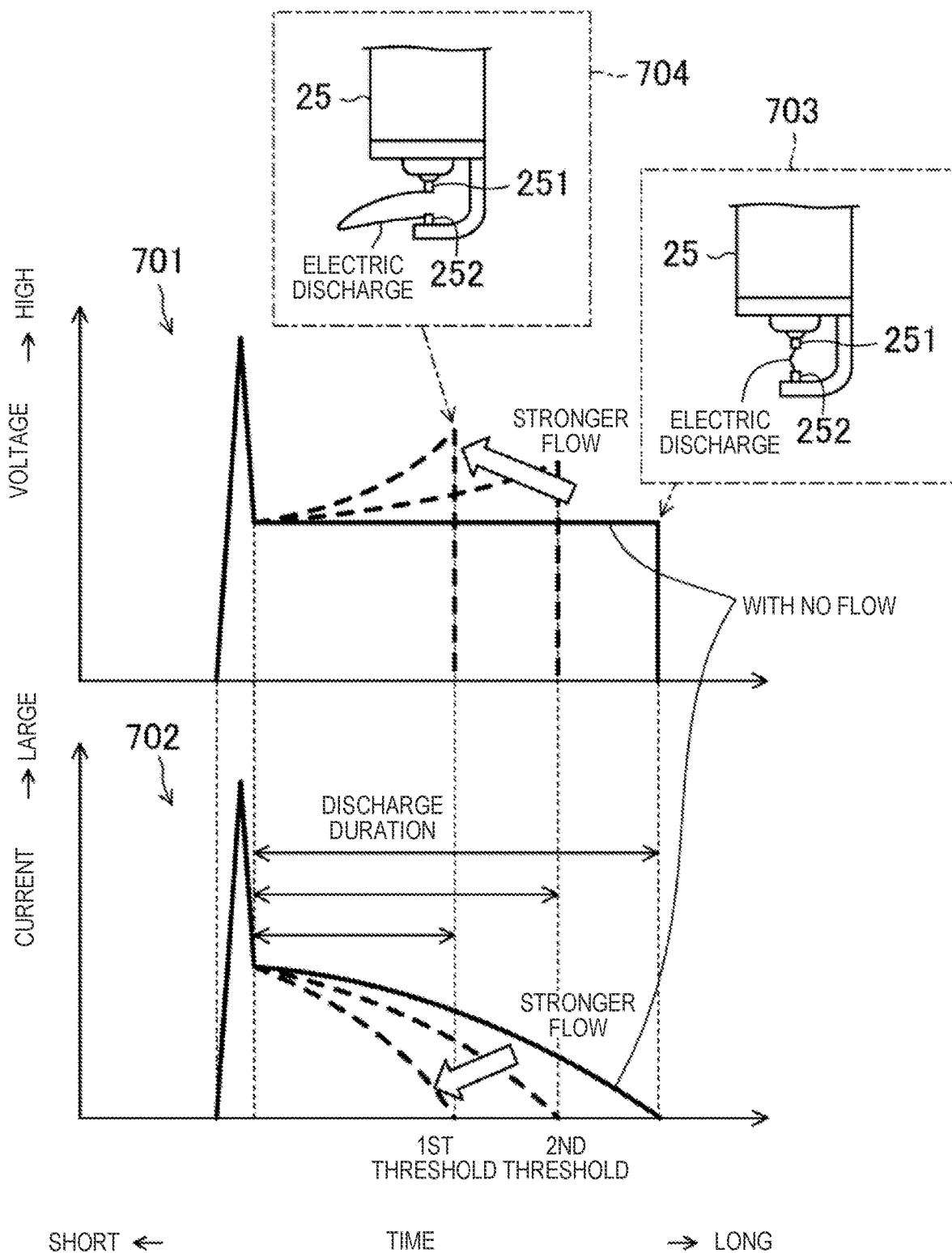
FIG. 7 is a view illustrating a time-series change in voltage and current between electrodes of a spark plug at different flow intensities around the spark plug.

FIG. 7 illustrates a time-series change 701 in the voltage and a time-series change 702 in the current between the electrodes of the spark plug 25 at different flow intensities around the spark plug 25. When the spark plug 25 is applied with energy and voltage is applied between the electrodes, an electric-discharge channel is formed between the center electrode 251 and the ground electrode 252 (see charts 703 and 704). As the intensity of the flow around the spark plug 25 increases, the electric-discharge channel is blown and extended by the flow. The extension of the electric-discharge channel increases the resistance between the electrodes, which accelerates a decrease in the voltage applied between the electrodes. As the intensity of the flow around the spark plug 25 increases, a period of time required for the consumption of the energy applied to the spark plug 25 (i.e., the discharge duration) becomes shorter.

In more detail, as indicated by solid lines in FIG. 7, when there is no flow around the spark plug 25, the electric-discharge channel is hardly extended (see chart 703), and thus, the discharge duration is long. Since the electric-discharge channel extends as the intensity of the flow around the spark plug 25 increases (see chart 704), the discharge duration becomes shorter as illustrated by broken lines and dotted lines in charts 701 and 702. That is, the discharge duration of the current between the electrodes of the spark plug 25 is in proportion to the intensity of the flow around the spark plug 25. When the ignition device 7 detects the discharge duration, the determination module 83 can estimate the intensity of the flow (i.e., a flow velocity) around the spark plug 25.

Figure 8:
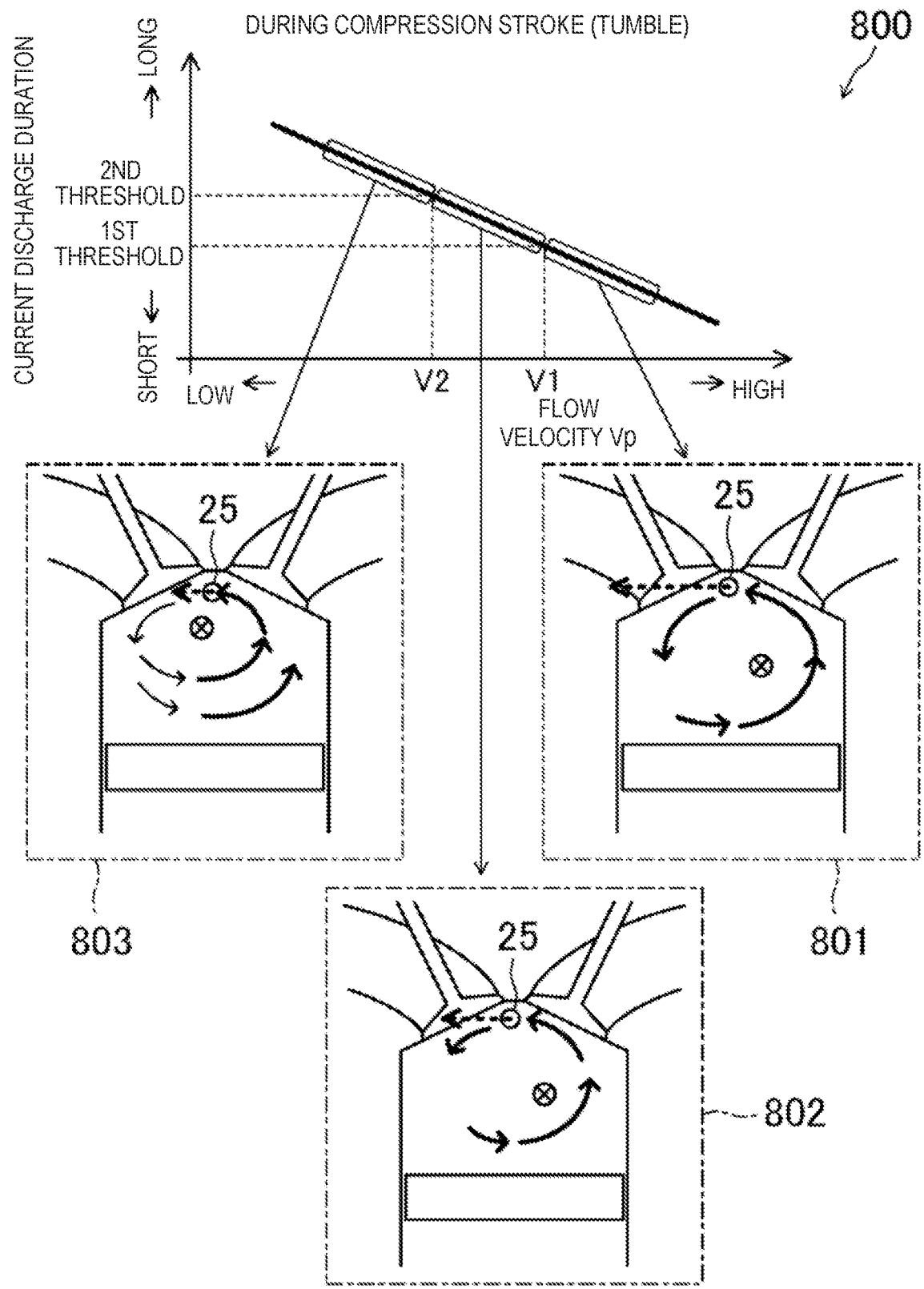
FIG. 8 is a view illustrating a duration of an electric discharge detected by the ignition device, and the center of the tumble vortex.

FIG. 8 illustrates a relationship between the discharge duration detected by the ignition device 7, and the center of the tumble vortex inside the cylinder 11. Chart 800 of FIG. 8 illustrates a relationship between the discharge duration and a flow velocity Vp around the spark plug 25. As described above, the discharge duration is in proportion to the flow velocity Vp, and the flow velocity Vp increases as the discharge duration is shorter, and the flow velocity Vp decreases as the discharge duration is longer.

As illustrated in chart 802 of FIG. 8, when the center of the tumble vortex is at the middle between the piston 3 and the ceiling inside the cylinder 11 in the early half of the compression stroke, the center of the vortex is separated from the spark plug 25 to some extent. Therefore, the flow velocity Vp around the spark plug 25 is between V1 and V2.

On the other hand, as illustrated in chart 801, when the center of the tumble vortex is near the piston 3 in the early half of the compression stroke, the center of the vortex is largely separated from the spark plug 25. Therefore, the flow velocity Vp around the spark plug 25 is higher than V1.

Moreover, as illustrated in chart 803, when the center of the tumble vortex is near the ceiling in the early half of the compression stroke, the center of the vortex is near the spark plug 25. Therefore, the flow velocity Vp around the spark plug 25 is lower than V2.

The tumble vortex which is formed inside the cylinder 11 mainly by a tumble flow, becomes stable and the center of the tumble vortex is defined during the compression stroke after the intake valve 21 is closed. Therefore, the center of the tumble vortex can be estimated by the spark plug 25 carrying out the electrical discharge (a second electric discharge described later) and the ignition device 7 detecting the discharge duration (a second discharge duration described later) in the early half of the compression stroke. If the discharge duration is shorter than a first threshold corresponding to the velocity V1, the center of the tumble vortex can be estimated to be near the piston 3. If the discharge duration is longer than a second threshold corresponding to the velocity V2, the center of the tumble vortex can be estimated to be near the ceiling. If the discharge duration is between the first threshold and the second threshold, the center of the tumble vortex can be estimated to be at the middle of the combustion chamber 17 in the side view.

Figure 9:
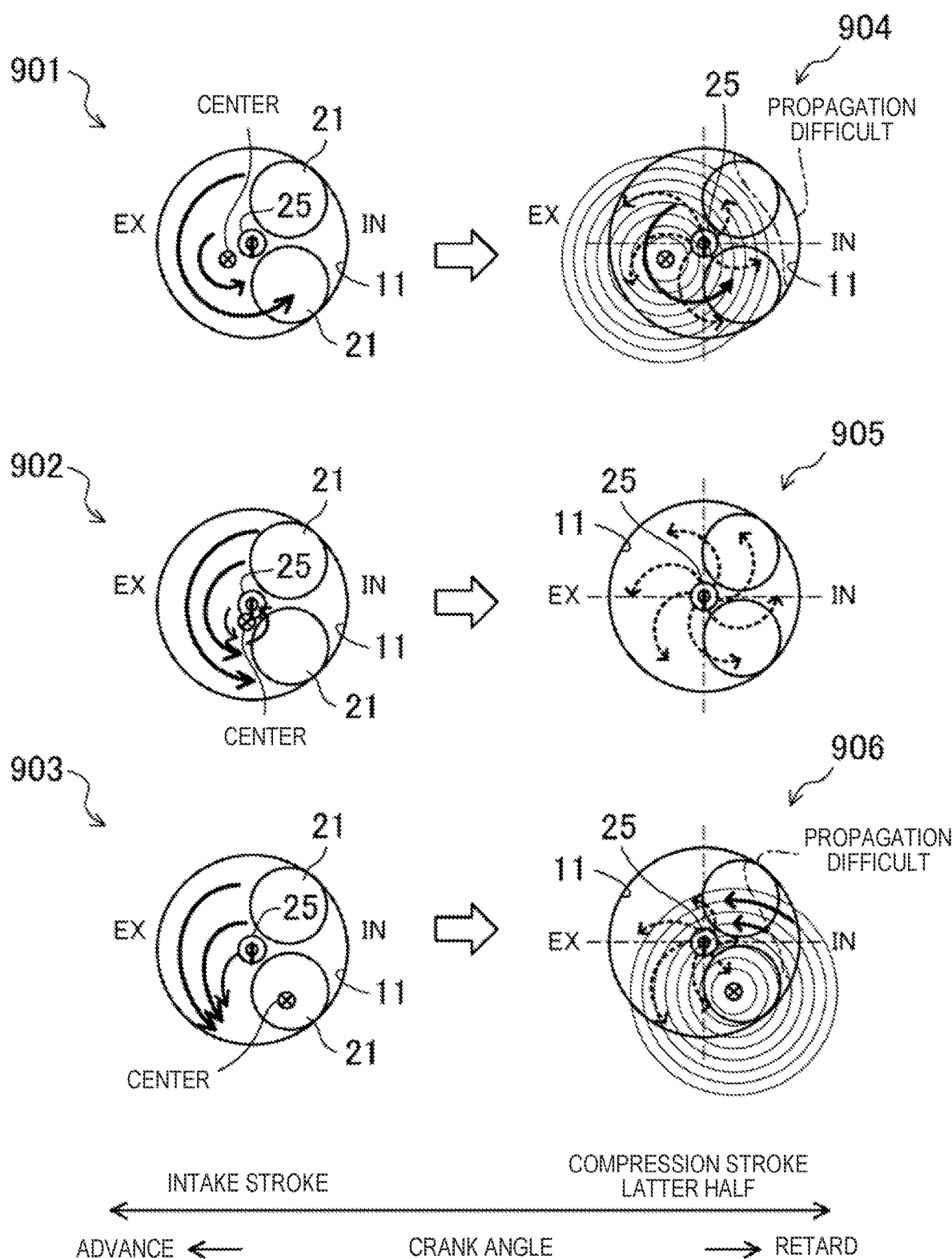
FIG. 9 is a view illustrating a relationship between the center of a swirl vortex and a propagation state of flame inside the cylinder.

FIG. 9 is a view illustrating a relationship between the center of the swirl vortex during the intake stroke and the flowing state inside the cylinder 11 in the latter half of the compression stroke. Chart 901 of FIG. 9 illustrates the flowing state inside the cylinder 11 when the center of the swirl vortex deviates to the exhaust-valve side inside the cylinder 11 during the intake stroke. Chart 904 illustrates a propagation state of the flame after the latter half of the compression stroke, in which the crank angle progressed from the state of chart 901.

Similarly, chart 902 illustrates the flowing state inside the cylinder 11 when the center of the swirl vortex is almost on the axis of the cylinder 11 at the central part of the cylinder 11 during the intake stroke. Chart 905 illustrates the propagation state of the flame after the latter half of the compression stroke, in which the crank angle progressed from the state of chart 902.

Moreover, chart 903 illustrates the flowing state inside the cylinder 11 when the center of the swirl vortex deviates to the intake-valve side inside the cylinder 11 during the intake stroke. Chart 906 illustrates the flowing state inside the cylinder in the latter half of the compression stroke, in which the crank angle progressed from the state of chart 903.

First, as illustrated in chart 902, when the center of the swirl vortex inside the cylinder 11 is located on the axis at the central part of the cylinder 11 in the plan view, the center of the swirl vortex is located near the axis also in the latter half of the compression stroke. The turbulence inside the cylinder 11 is uniform or substantially uniform entirely inside the cylinder 11. When the spark plug 25 ignites the mixture gas at the central part of the cylinder 11, the flame is propagated from the central part toward the peripheral part inside the cylinder 11 while being curved in the circumferential direction by the swirl vortex as indicated by broken arrows in chart 905. The flame is uniformly or substantially uniformly propagated from around the center toward the peripheral part inside the cylinder 11. Since the propagation of the flame is accelerated by the turbulence inside the cylinder 11, the combustion speed is comparatively high.

As illustrated in chart 901, when the center of the swirl vortex deviates to the exhaust-valve side in the plan view, the center of the swirl vortex deviates from the center of the cylinder 11. The turbulence inside the cylinder 11 becomes uneven entirely inside the cylinder 11. Moreover, when the spark plug 25 ignites the mixture gas at the central part of the cylinder 11 near the compression TDC in the latter half of the compression stroke, the flame is propagated from the central part toward the peripheral part inside the cylinder 11 while being curved (turned) in the circumferential direction by the swirl vortex as indicated by broken arrows in Chart 904. Here, the flow velocity of the swirl vortex is higher as being separated from the center of the swirl vortex (see concentric circles in chart 904). That is, the flow velocity of the swirl vortex is relatively high on the intake-valve side which is far from the center of the swirl vortex. Although the flame propagating from the central part of the cylinder 11 to the exhaust-valve side propagates radially outwardly while being curved in the circumferential direction, the flame propagating from the central part of the cylinder 11 to the intake-valve side is intensely curved by the swirl vortex at the high flow velocity, thus the radially outward propagation being difficult. As a result, the flame propagation in the intake-side area is difficult as indicated by the one-dot chain line in chart 904. In this case, the combustion speed is lower than the case of chart 905.

As illustrated in chart 903, also when the center of the swirl vortex deviates to the intake-valve side in the plan view, the center of the swirl vortex deviates from the center of the cylinder 11. The turbulence inside the cylinder 11 becomes uneven entirely inside the cylinder 11. Moreover, when the spark plug 25 ignites the mixture gas at the central part of the cylinder 11 near the compression TDC in the latter half of the compression stroke, the flame is propagated from the central part toward the peripheral part inside the cylinder 11 while being curved in the circumferential direction by the swirl vortex as indicated by broken arrows in chart 906. Here, the direction from the central part to the intake-valve side of the cylinder 11 is the direction opposite from the flow of the swirl vortex in the counterclockwise direction indicated by solid lines in chart 906. As a result, although the flame propagating from the central part of the cylinder 11 to the exhaust-valve side propagates radially outwardly while being curved in the circumferential direction, the flame propagating from the central part of the cylinder 11 to the intake-valve side is pushed back by the flow of the swirl vortex, thus the radially outward propagation being difficult. As a result, the flame propagation in the intake-side area is difficult as indicated by the one-dot chain line in chart 906. In this case, the combustion speed is lower than the case of chart 905.

Figure 10:
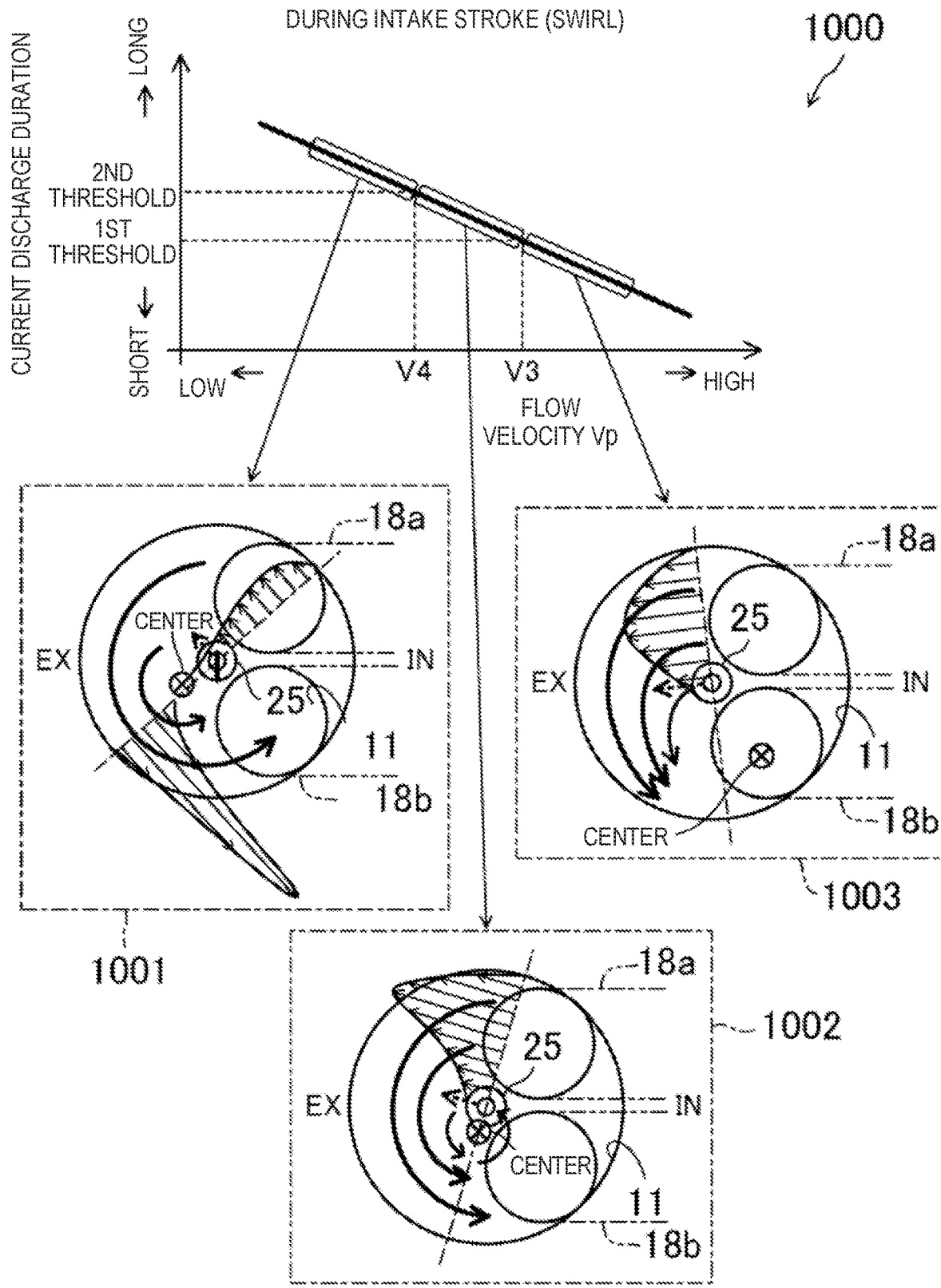
FIG. 10 is a view illustrating a relationship between the duration of the electric discharge detected by the ignition device, and the center of the swirl vortex.

FIG. 10 illustrates a relationship between the duration of the electric discharge detected by the ignition device 7, and the center of the swirl vortex inside the cylinder 11. Chart 1000 of FIG. 10 illustrates a relationship between the discharge duration and the flow velocity around the spark plug 25.

The intake air is flown into the cylinder 11 mainly from the first intake passage 18a to generate the swirl flow. As illustrated in chart 1002 of FIG. 10, a flow-velocity distribution occurs inside the cylinder 11 during the intake stroke by the intake air which is introduced mainly from the first intake passage 18a. The center of the swirl vortex is located on the axis around the central part of the cylinder 11 when the velocity distribution during the intake stroke is as illustrated in chart 1002, in which the flow velocity is the maximum at a certain position in the radial direction between the central part and a liner of the cylinder 11, and the flow velocity decreases toward the central part and toward the liner from the certain position. In this case, the flow velocity around the spark plug 25 is between V3 and V4.

On the other hand, as illustrated in chart 1001, in a case of the flow-velocity distribution in which the flow velocity near the liner is extremely high during the intake stroke, the center of the swirl vortex deviates to the exhaust-valve side. In this case, the flow velocity around the spark plug 25 is lower than V4.

Moreover, as illustrated in chart 1003, when the maximum flow velocity is comparatively low, and a kurtosis of the flow velocity is small in the flow-velocity distribution during the intake stroke, the center of the swirl vortex deviates to the intake-valve side. In this case, the flow velocity around the spark plug 25 is higher than V3.

The swirl vortex formed mainly by a swirl flow inside the cylinder 11 becomes stable during the intake stroke between the opening and closing of the intake valve 21. The ignition device 7 causes the spark plug 25 to carry out the electrical discharge (a first electric discharge described later) and detects the discharge duration (a first discharge duration described later) during the intake stroke. In detail, the flow of the intake air easily changes for a certain period from the opened timing of the intake valve 21. The swirl vortex stabilizes after the certain period from the opening of the intake valve 21, before the closing of the intake valve 21. The ignition device 7 causes the spark plug 25 to carry out the electric discharge after a given period (a time constant $\Delta t$ described later) from the opening of the intake valve 21, and detects the discharge duration.

The determination module 83 can determine that the center of the swirl vortex deviates to the intake-valve side when the discharge duration is shorter than the first threshold corresponding to the velocity V3. The determination module 83 can determine that the center of the swirl vortex deviates to the exhaust-valve side when the discharge duration is longer than the second threshold corresponding to the velocity V4. The determination module 83 can determine that the center of the swirl vortex is on the axis at the central part of the cylinder 11 when the discharge duration is between the first threshold and the second threshold. Note that the velocity V3 corresponding to the first threshold and the velocity V1 described above are not necessarily the same. Similarly, the velocity V4 corresponding to the second threshold and the velocity V2 described above are not necessarily the same.

(Supplemental Ignition Control)

Figure 11:
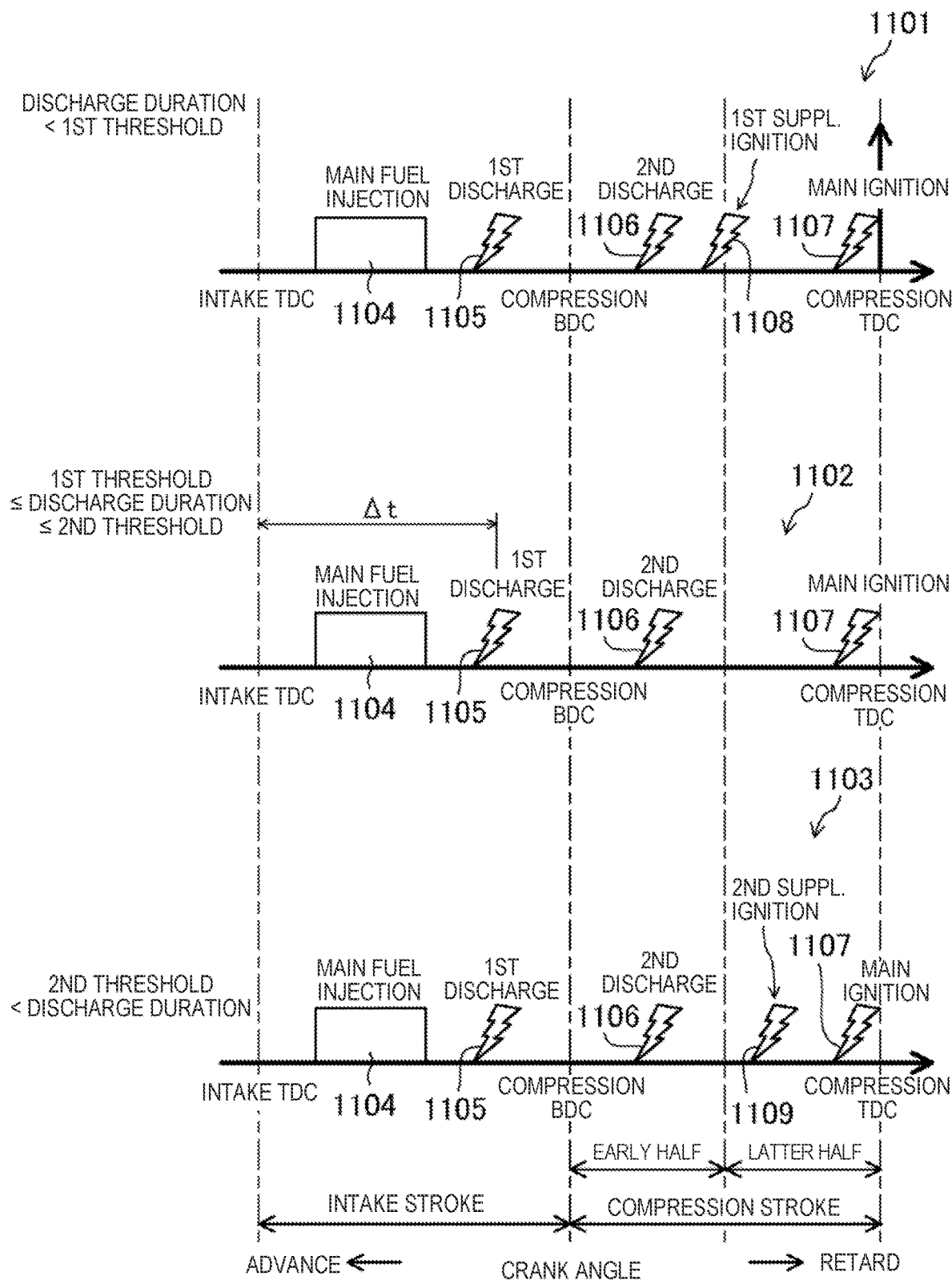
FIG. 11 is a time chart illustrating an injection timing of main fuel, a timing of the electric discharge, a timing of a supplemental ignition, and a timing of a main ignition.

FIG. 11 is a time chart illustrating the timing of the fuel injection by the injector 6, and the timings of the electric discharge, the supplemental ignition, and the main ignition by the spark plug 25. The crank angle progresses from the left to the right in FIG. 11.

As described above, when the center of the tumble vortex and/or the swirl vortex deviate due to the variation in the intake flow, the area with a small turbulence and/or the area with difficulty in the flame propagation are generated inside the cylinder 11. The supplemental ignition makes the mixture gas increased in the temperature by the hot plasma be positioned in the area with the small turbulence and/or the area with the difficulty in the flame propagation so as to accelerate the flame propagation toward such specific areas.

First, the main fuel injection module 81 causes the injector 6 to inject the main fuel inside the cylinder 11 in a period during the intake stroke between the opening and closing of the intake valve 21 (see a main fuel injection 1104). The main fuel is spread inside the cylinder 11 by the flow, and the mixture gas is generated inside the cylinder 11.

As illustrated in chart 1102, the determination module 83 causes the ignition device 7 and the spark plug 25 to carry out a first electric discharge 1105 at a timing during the intake stroke after the given time constant Δt passes from the opening of the intake valve 21. The first electric discharge 1105 is the electric discharge which is performed when the mixture gas is not ignited. The ignition device 7 detects the first discharge duration of the first electric discharge. The determination module 83 estimates the center of the swirl vortex based on the first discharge duration detected in the first electric discharge 1105.

The determination module 83 also causes the ignition device 7 and the spark plug 25 to carry out a second electric discharge 1106, for example, in the early half of the compression stroke after the closing of the intake valve 21. Also the second electric discharge 1106 is the electric discharge which is performed when the mixture gas is not ignited. The ignition device 7 detects the second discharge duration of the second electric discharge. The determination module 83 estimates the center of the tumble vortex based on the second discharge duration detected in the second electric discharge 1106.

When both of the first discharge duration and the second discharge duration detected by the ignition device 7 are between the first threshold and the second threshold, the center of the tumble vortex is located at the middle between the piston 3 and the ceiling inside the cylinder 11, and the center of the swirl vortex is located on the axis at the central part of the cylinder 11. In this case, the injection of the supplemental ignition is unnecessary. As illustrated in chart 1102 of FIG. 11, the supplemental ignition control module 84 suspends the supplemental ignition, and the main ignition control module 82 causes the spark plug 25 to ignite the mixture gas at the given timing near the compression TDC in the latter half of the compression stroke (see a main ignition 1107 of FIG. 11). In this case, since the centers of the swirl vortex and the tumble vortex are located at the central part of the cylinder 11 when seen in a plan view and side view, respectively, the turbulence is uniform or substantially uniform entirely inside the cylinder 11. The flame uniformly or substantially uniformly propagates from the central part toward the peripheral part of the cylinder 11. The combustion speed is comparatively high.

Next, the case where the second discharge duration detected by the ignition device 7 is below (shorter than) the first threshold is described. In this case, the center of the tumble vortex is near the piston 3 inside the cylinder 11, and the forward one-way flow is generated inside the cylinder 11 in the latter half of the compression stroke. As illustrated in chart 1101 of FIG. 11, the supplemental ignition control module 84 causes the spark plug 25 to carry out a first supplemental ignition 1108. The spark plug 25 carries out the first supplemental ignition 1108 at a first operation timing, for example, in the early half of the compression stroke or the latter half of the compression stroke.

Figure 12:
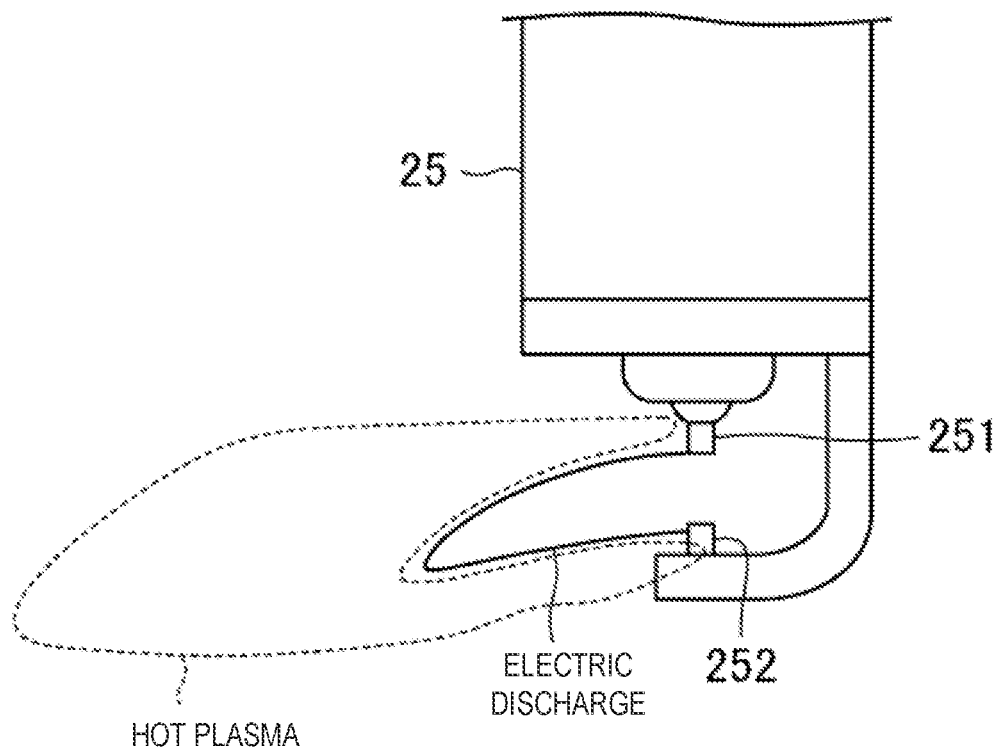
FIG. 12 is a view schematically illustrating a situation where a hot plasma is generated by the supplemental ignition by the spark plug.

As illustrated in FIG. 12, by the ignition device 7 applying the energy to the spark plug 25, the arc discharge occurs between the center electrode 251 and the ground electrode 252 of the spark plug 25 (i.e., the supplemental ignition).

The hot plasma thus generated inside the cylinder 11 rides on the flow inside the cylinder 11 to be carried.

Figure 13:
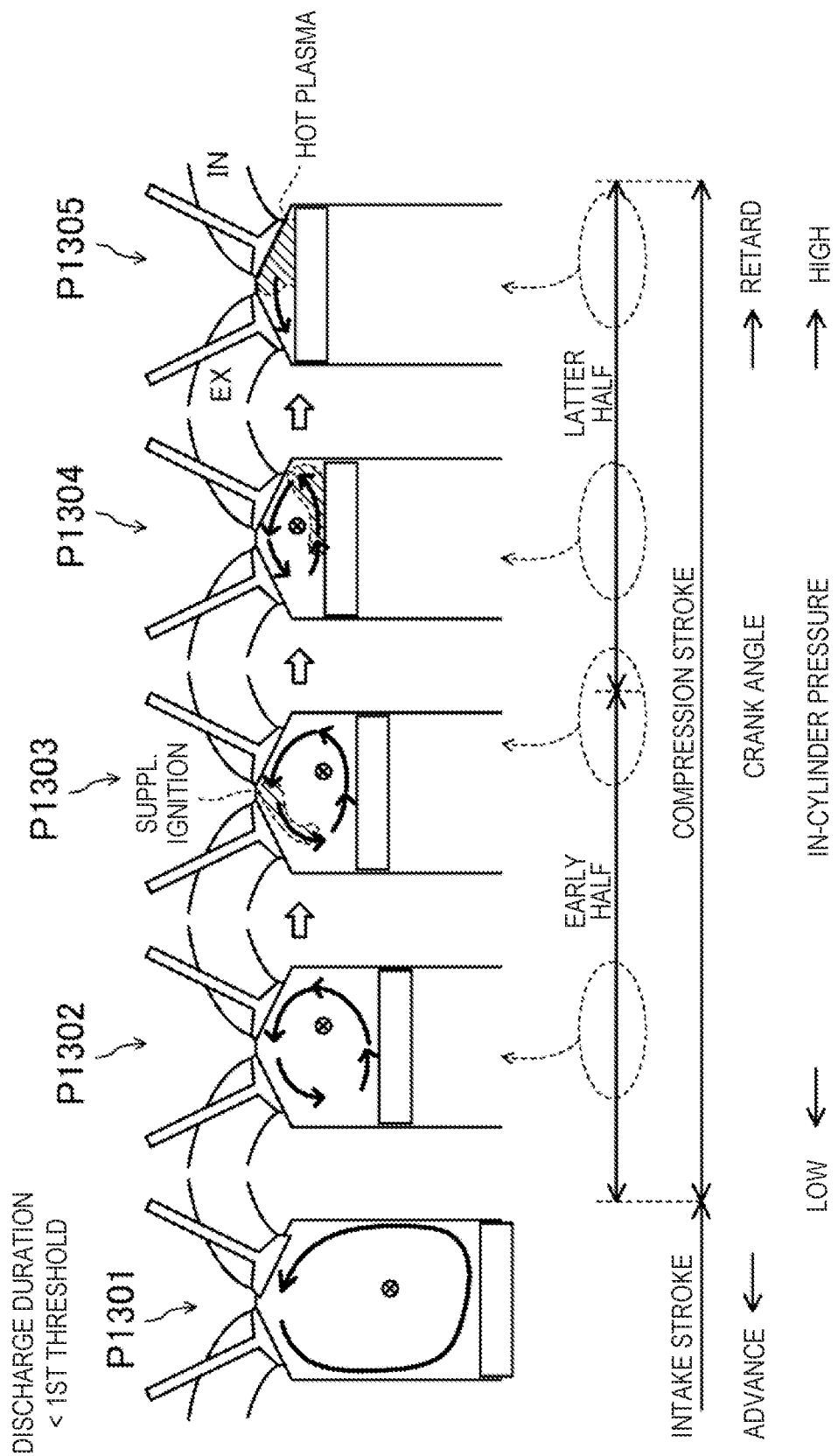
FIG. 13 is a view illustrating a change in a flow and distribution of the hot plasma inside the cylinder when the center of the tumble vortex is near a piston.

FIG. 13 is a view illustrating the flow change and distribution of the hot plasma inside the cylinder 11 when the center of the tumble vortex is near the piston 3 inside the cylinder 11. As described above, when the center of the tumble vortex is near the piston 3, the center of the vortex contacts the top surface of the piston 3 and the lower half of the tumble vortex is broken as the piston 3 ascends as illustrated in P1301, P1302, P1303, and P1304, in this order. Accordingly, as indicated by a black arrow in P1305, the flow inside the cylinder 11 becomes the forward one-way flow from the intake valve 21 toward the exhaust valve 22 in the latter half of the compression stroke.

The spark plug 25 carries out the first supplemental ignition at a relatively early timing (P1303) during the compression stroke, and since the pressure inside the cylinder 11 is not relatively high at that early timing, the hot plasma generated inside the cylinder 11 rides on the tumble vortex to be carried from the exhaust-valve side to the intake-valve side (see hatched areas in P1303, P1304, and P1305) before the vortex is broken. As a result, the mixture gas around the intake valve can be high in the temperature.

After the first supplemental ignition 1108, the main ignition control module 82 causes the spark plug 25 to ignite the mixture gas at the given timing near the compression TDC in the latter half of the compression stroke (see the main ignition 1107 in chart 1101). Although the flame is difficult to be propagated toward the intake-valve side due to the forward one-way flow, since the temperature of the mixture gas is high on the intake-valve side, the flame propagation toward the intake-valve side is accelerated. Accordingly, the combustion speed is increased to the extent similar to the case where the discharge duration is between the first threshold and the second threshold. Therefore, combustion variation of the engine 1 is reduced.

Next, the case where the second discharge duration detected by the ignition device 7 is above (longer than) the second threshold is described. In this case, the center of the tumble vortex is near the ceiling inside the cylinder 11, and the backward one-way flow is generated inside the cylinder 11 in the latter half of the compression stroke. As illustrated in chart 1103 in FIG. 11, the supplemental ignition control module 84 causes the spark plug 25 to perform a second supplemental ignition 1109. The spark plug 25 performs the second supplemental ignition 1109 at a second operation timing in the latter half of the compression stroke. The timing of the second supplemental ignition 1109 is later than the timing of the first supplemental ignition 1108.

Figure 14:
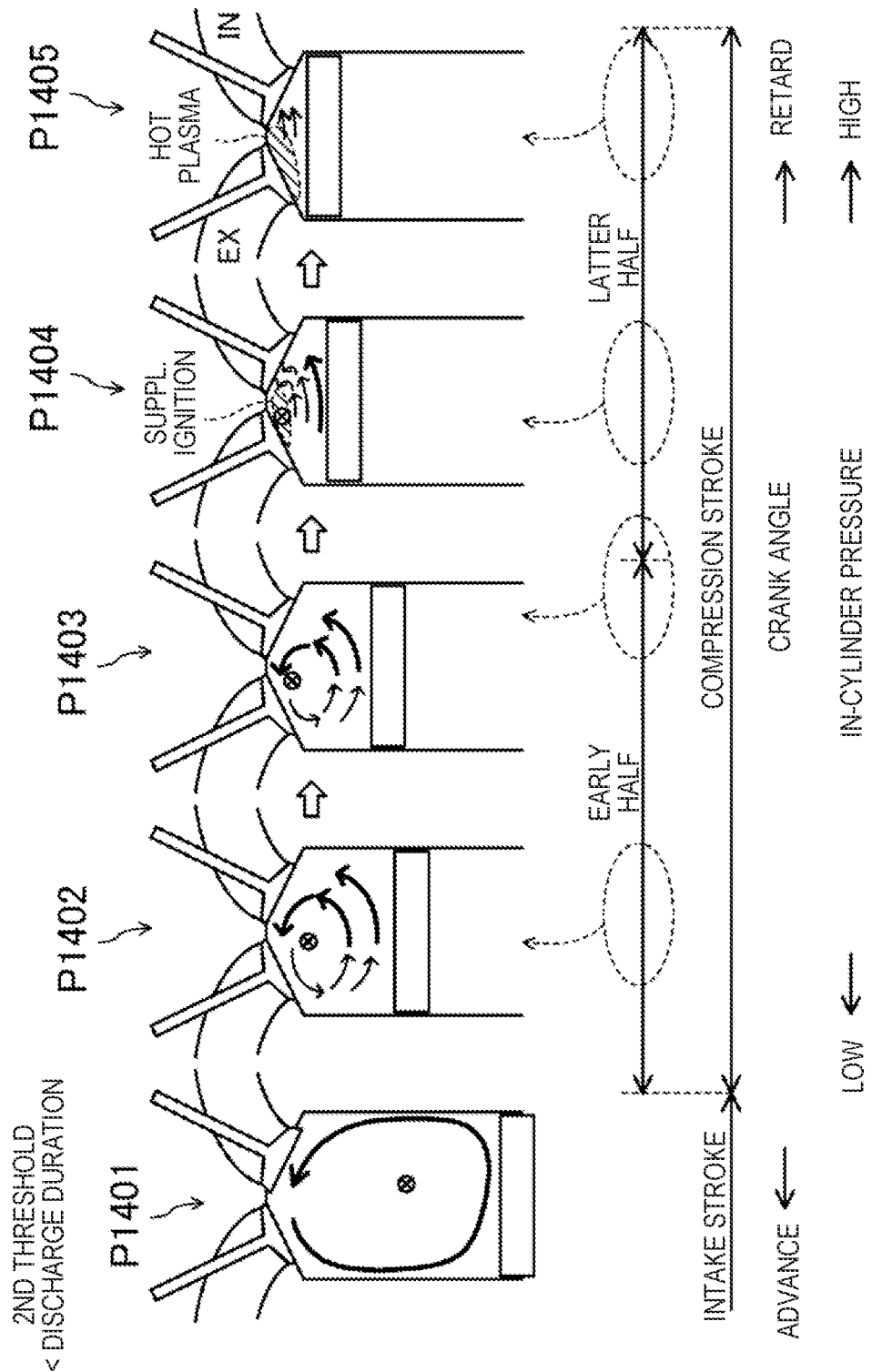
FIG. 14 is a view illustrating the change in the flow and the distribution of the hot plasma inside the cylinder when the center of the tumble vortex is near a ceiling.

FIG. 14 is a view illustrating the flow change and distribution of the hot plasma inside the cylinder 11 when the center of the tumble vortex is near the ceiling inside the cylinder 11. As described above, when the center of the tumble vortex is near the ceiling, the center of the vortex contacts the ceiling and the upper half of the tumble vortex is broken as the piston 3 ascends as illustrated in P1401, P1402, P1403, and P1404, in this order. Accordingly, as indicated by black arrows in P1405, the flow inside the cylinder 11 becomes the backward one-way flow from the exhaust valve 22 toward the intake valve 21 in the latter half of the compression stroke.

The spark plug 25 carries out the second supplemental ignition in the latter half of the compression stroke (see P1404). Since the pressure inside the cylinder 11 is high in the latter half of the compression stroke, the hot plasma generated inside the cylinder 11 stays at the central part inside the cylinder 11 by receiving the high compression pressure, as well as flowing to the exhaust-valve side where the flow is relatively weak (see hatched areas in P1404 and P1405). As a result, the mixture gas at the high temperature can be positioned around the exhaust valve.

After the second supplemental ignition 1109, the main ignition control module 82 causes the spark plug 25 to ignite the mixture gas at the given timing near the compression TDC in the latter half of the compression stroke (see the main ignition 1107 in chart 1103). Although the flame is difficult to be propagated toward the exhaust-valve side due to the backward one-way flow, since the temperature of the mixture gas is high on the exhaust-valve side, the flame propagation toward the exhaust-valve side is accelerated. Accordingly, the combustion speed is increased to the extent similar to the case where the discharge duration is between the first threshold and the second threshold. Therefore, combustion variation of the engine 1 is reduced.

Therefore, by performing the supplemental ignition according to the flowing state inside the cylinder 11, even when the center of the tumble vortex varies due to the variation in the state of the intake flow between the cycles, the ECU 10 can make the combustion speed to be the same or substantially the same. Thus, combustion variation can be reduced.

Next, the case where the first discharge duration detected by the ignition device 7 is below (shorter than) the first threshold is described. In this case, the center of the swirl vortex is deviated to the intake-valve side inside the cylinder 11. As illustrated in chart 1101 of FIG. 11, the supplemental ignition control module 84 causes the spark plug 25 to perform the first supplemental ignition 1108. The spark plug 25 carries out the first supplemental ignition 1108 at the first operation timing, for example, in the early half of the compression stroke or the latter half of the compression stroke.

Figure 15:
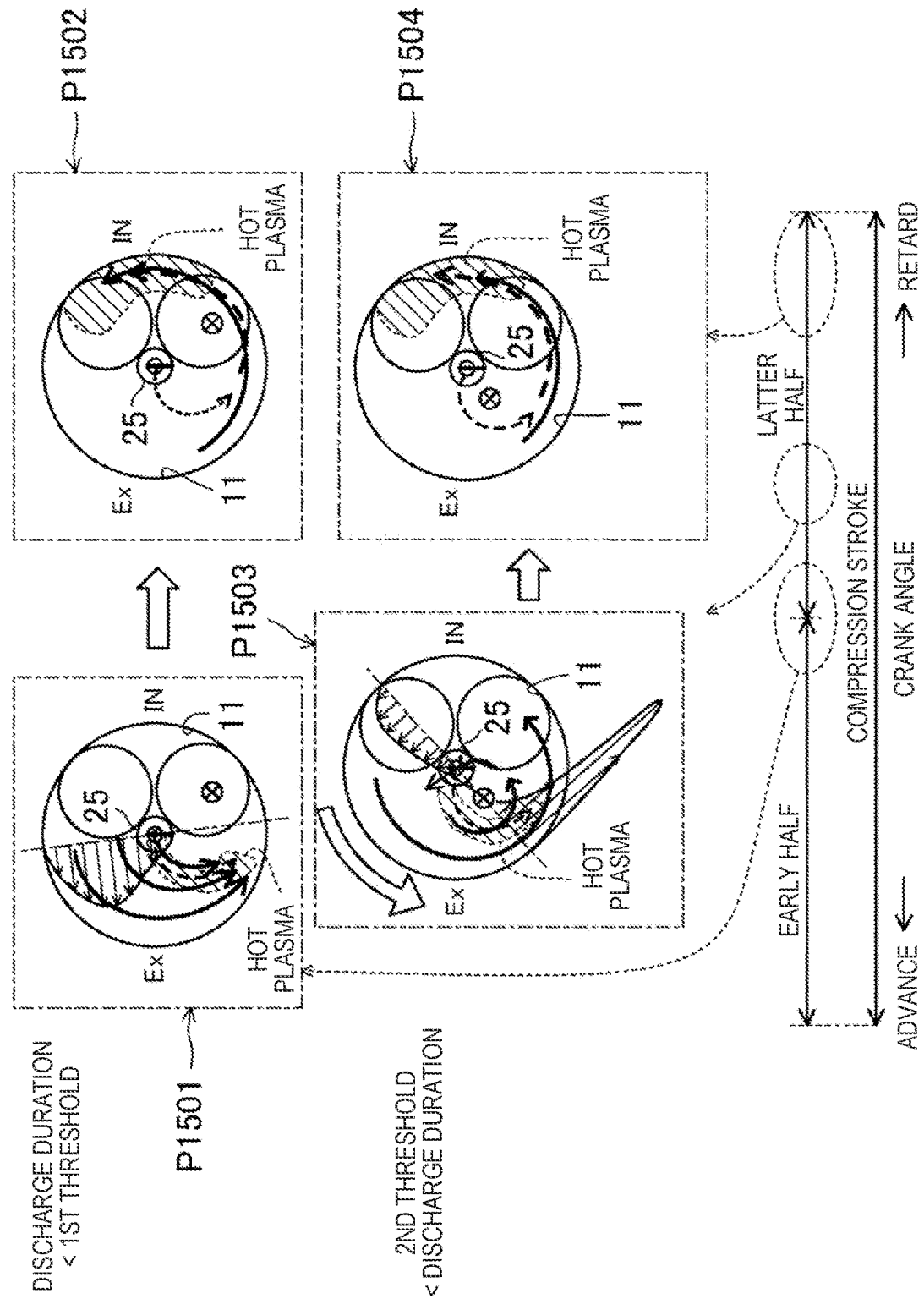
FIG. 15 is a view illustrating the change in the flow and the distribution of the hot plasma inside the cylinder when the center of the swirl vortex deviates toward an exhaust valve, and when the center of the swirl vortex deviates toward an intake valve.

P1501 and P1502 in FIG. 15 are views illustrating the flow change and distribution of the hot plasma inside the cylinder 11 when the center of the swirl vortex is deviated to the intake-valve side. When the center of the swirl vortex is deviated to the intake-valve side, as illustrated in P1501, the kurtosis of the flow velocity distribution inside the cylinder 11 during the compression stroke is low. Therefore, an area where the flow velocity is extremely high does not exist.

The hot plasma generated by the spark plug 25 at the central part inside the cylinder 11 in the early or latter half of the compression stroke after the second electric discharge, rides on the flow indicated by solid arrows in FIG. 15 to be carried radially outwardly, as well as being carried in the circumferential direction along the liner (see broken arrows in FIG. 15). Since the supplemental-ignition timing is relatively advanced, a long period of time is spent for the hot plasma to be carried to the intake-valve side. As a result, the temperature of the mixture gas on the intake-valve side is increased at the ignition timing (P1502).

After the first supplemental ignition, the main ignition control module 82 causes the spark plug 25 to ignite the mixture gas at the given timing near the compression TDC in the latter half of the compression stroke (see the main ignition 1107 of chart 1101). As described above, since the flame is prevented from propagating radially outwardly by the swirl vortex with the deviated center, the propagation toward the intake-valve side is difficult. However, since the temperature of the mixture gas on the intake-valve side is high, the flame propagation toward the intake-valve side is accelerated. Accordingly, the combustion speed is increased to the extent similar to the case where the discharge duration is between the first threshold and the second threshold. Therefore, combustion variation of the engine 1 is reduced.

Next, the case where the first discharge duration detected by the ignition device 7 is above (longer than) the second threshold is described. In this case, the center of the swirl vortex is deviated to the exhaust-valve side inside the cylinder 11. As illustrated in chart 1103 of FIG. 11, the supplemental ignition control module 84 causes the spark plug 25 to perform the second supplemental ignition 1109. The spark plug 25 carries out the second supplemental ignition 1109 at the second operation timing in the latter half of the compression stroke. The timing of the second supplemental ignition 1109 is later than the timing of the first supplemental ignition 1108.

P1503 and P1504 in FIG. 15 are views illustrating the flow change and distribution of the hot plasma inside the cylinder 11 when the center of the swirl vortex is deviated to the exhaust-valve side. When the center of the swirl vortex is deviated to the exhaust-valve side, as illustrated in P1503, the velocity distribution inside the cylinder 11 in the latter half the compression stroke includes an area near the liner where the flow velocity is extremely high.

The hot plasma generated by the spark plug 25 at the central part inside the cylinder 11 at the late timing in the latter half of the compression stroke, is carried radially outwardly, and rides on the fast flow in the circumferential direction to be promptly carried to the intake-valve side in the circumferential direction along the liner. As a result, the temperature of the mixture gas on the intake-valve side is increased at the ignition timing (P1504).

After the second supplemental ignition 1109, the main ignition control module 82 causes the spark plug 25 to ignite the mixture gas at the given timing near the compression TDC in the latter half of the compression stroke (see the main ignition 1107 of chart 1103). As described above, the flame is difficult to be propagated toward the intake-valve side since the propagating direction is curved by the swirl vortex with the deviated center. However, since the temperature of the mixture gas is high on the intake-valve side, the flame propagation toward the intake-valve side is accelerated. Accordingly, the combustion speed is increased to the extent similar to the case where the discharge duration is between the first threshold and the second threshold. Therefore, combustion variation of the engine 1 is reduced.

Therefore, by performing the supplemental ignition according to the flowing state inside the cylinder 11, even when the center of the swirl vortex varies due to the variation in the state of the intake flow between the cycles, the ECU 10 can make the combustion speed to be constant or substantially constant. Thus, combustion variation of the engine 1 can be reduced.

Note that the energies applied to the spark plug 25 in the first electric discharge, the second electric discharge, the first supplemental ignition, the second supplemental ignition, and the main ignition may be the same as, or different from each other. Moreover, in the first supplemental ignition and the second supplemental ignition, the spark plug 25 may generate a cold plasma by being repetitively applied with short voltage pulses. The cold plasma also accelerates the flame propagation, and thus contributes to the improvement in the combustion speed.

(Controlling Process of Engine Control Device)

Figure 16:
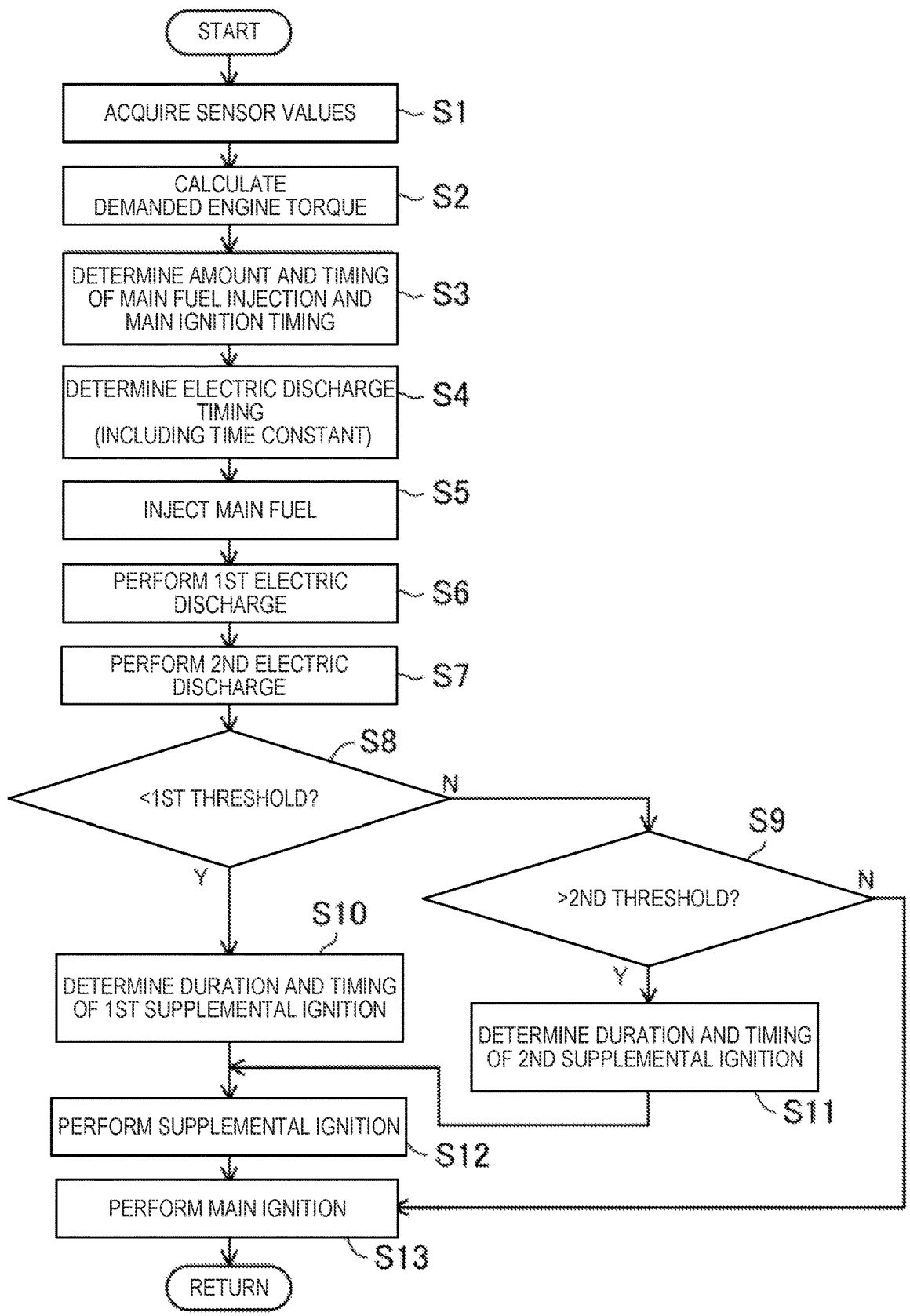
FIG. 16 is a flowchart illustrating a process for controlling the engine executed by an ECU.

Next, a controlling process of the control device of the engine 1 described above is described with reference to the flowchart of FIG. 16. First, at step S1, the ECU 10 acquires the sensor values of the sensors SW1 to SW9. Next, at step S2, the ECU 10 calculates the demanded torque of the engine 1 based on the acquired sensor values. At step S3, the ECU 10 determines the injection amount and injection timing of the main injection, which can achieve the demanded torque. The ECU 10 also determines the main ignition timing.

At step S4, the ECU 10 determines the timings of the first electric discharge and the second electric discharge. At this step, the ECU 10 also determines the time constant Δt for the execution of the first electric discharge. For example, the ECU 10 may adjust the time constant Δt according to the operating state of the engine 1 (i.e., the load and/or the speed of the engine 1)

Next, at step S5, the ECU 10 causes the injector 6 to carry out the main injection 1104 based on the injection amount and injection timing determined at Step S3. As illustrated in FIG. 11, the injector 6 performs the main injection 1104 during the intake stroke.

At step S6, the ECU 10 causes the ignition device 7 to carry out the first electric discharge 1105. The ignition device 7 performs the first electric discharge 1105 during the intake stroke, and detects the first discharge duration. Moreover, at step S7, the ECU 10 causes the ignition device 7 to carry out the second electric discharge 1106. The ignition device 7 performs the second electric discharge 1106 in the early half of the compression stroke, and detects the second discharge duration.

At step S8, the ECU 10 determines whether the first discharge duration is below the first threshold, and whether the second discharge duration is below the first threshold. When the ECU 10 determines as YES at step S8 (when the first discharge duration or the second discharge duration is below the first threshold), the process proceeds to Step s10. When the ECU 10 determines as NO at step S8, the process proceeds to step S9.

At step S9, the ECU 10 determines whether the first discharge duration is above the second threshold, and whether the second discharge duration is above the second threshold. When the ECU 10 determines as YES at step S9 (when the first discharge duration or the second discharge duration is above the second threshold), the process proceeds to step S11. When the ECU 10 determines as NO at step S9, the supplemental fuel is not injected.

At step S10, the ECU 10 determines the duration and the timing of the first supplemental ignition 1108. As described above, the timing of the first supplemental ignition 1108 is advanced from the timing of the second supplemental ignition 1109. At step S11, the ECU 10 determines the duration and the timing of the second supplemental ignition 1109. As described above, the timing of the second supplemental ignition 1109 is retarded from the timing of the first supplemental ignition 1108. The duration and the timing of the first supplemental ignition 1108, and the duration and the timing of the second supplemental ignition 1109 may be determined, for example, according to the operating state of the engine 1.

After the ECU 10 determines the duration and the timing of the supplemental ignition, at step S12, the ECU 10 executes the supplemental ignition in the early or latter half of the compression stroke (in the case of the first supplemental ignition 1108), or in the latter half of the compression stroke (in the case of the second supplemental ignition 1109). Then, at step S13, the ECU causes the spark plug 25 to perform the main ignition to the mixture gas, which starts the combustion of the mixture gas.

Note that the injector 6 is not limited to injecting the main fuel during the intake stroke, but may inject the main fuel during the compression stroke. The spark plug 25 may perform the first electric discharge before or after the injection of the main fuel. Similarly, the spark plug 25 may perform the second electric discharge before or after the injection of the main fuel.

Moreover, the technology disclosed herein is applicable not only to the engine 1 with the configuration described above, but to engines with various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
11 Cylinder
1311 Sloped Surface (Ceiling)
1312 Sloped Surface (Ceiling)
25 Spark Plug
6 Injector (Fuel Injector)
7 Ignition Device
81 Main Fuel Injection Module
82 Main Ignition Control Module
83 Determination Module
84 Supplemental Ignition Control Module

What is claimed is:

1. A method of controlling an engine by using a controller, the engine including a cylinder with a pentroof ceiling, air being introduced into the cylinder through an intake valve provided to the ceiling; an ignition device including a spark plug provided at or near the center axis of the cylinder; and a fuel injector provided at or near the center axis of the cylinder, the method comprising the steps of:
  injecting main fuel by the fuel injector during one of an intake stroke and a compression stroke, and providing a mixture gas containing fuel and air inside the cylinder;
  applying by the ignition device a high voltage between electrodes of the spark plug at a timing when the mixture gas is not ignited, and detecting a parameter related to a current value of an electric-discharge channel generated between the electrodes;
  determining by the controller whether the detected parameter is within a range between a first threshold and a second threshold to determine a flowing state of a vortex inside the cylinder;
  when the parameter is determined to be outside the range, operating the spark plug to perform a supplemental ignition to generate hot plasma prior to a main ignition, and to perform the main ignition to ignite the mixture gas after the supplemental ignition; and
  when the parameter is determined to be within the range, operating the spark plug to perform only the main ignition to ignite the mixture gas.

2. The method of claim 1, wherein the operating the spark plug includes, when the parameter is determined to be below the first threshold, operating the spark plug at a first operation timing, and when the parameter is determined to be above the second threshold, operating the spark plug at a second operation timing retarded from the first operation timing.

3. The method of claim 2,
wherein the applying the high voltage includes detecting the parameter by the ignition device at a timing between an opening of the intake valve and a closing of the intake valve, and
wherein the determining whether the detected parameter is within the range includes determining by the controller a flowing state of a swirl vortex inside the cylinder based on the parameter.

4. The method of claim 3, wherein the applying the high voltage includes detecting the parameter by the ignition device after a given time constant passes from the opening of the intake valve.

5. The method of claim 2,
wherein the applying the high voltage includes detecting the parameter by the ignition device after the closing of the intake valve, and
wherein the determining whether the detected parameter is within the range includes determining by the controller a flowing state of a tumble vortex inside the cylinder based on the parameter.

6. The method of claim 2, wherein the applying the high voltage includes detecting the parameter by the ignition device during the intake stroke and during the compression stroke.

7. An engine system, comprising:
an engine including:
a cylinder with a pentroof ceiling, air being introduced into the cylinder through an intake valve provided to the ceiling;
an ignition device including a spark plug provided at or near the center axis of the cylinder; and
a fuel injector provided at or near the center axis of the cylinder; and
a controller electrically connected to the ignition device and the fuel injector,
wherein the controller includes a processor configured to execute:
a main fuel injection module to control the fuel injector to inject main fuel during one of an intake stroke and a compression stroke, and provide a mixture gas containing fuel and air inside the cylinder;
a determination module to control the ignition device to apply a high voltage between electrodes of the spark plug at a timing when the mixture gas is not ignited, and detect a parameter related to a current value of an electric-discharge channel generated between the electrodes, and to determine whether the parameter detected by the ignition device is within a range between a first threshold and a second threshold to determine a flowing state of a vortex inside the cylinder;
a supplemental ignition control module to control the ignition device to operate the spark plug to generate hot plasma; and
a main ignition control module to control the ignition device to operate the spark plug to ignite the mixture gas by the spark plug after the supplemental ignition control module operates the spark plug, wherein
when the determination module determines the parameter is outside the range, the spark plug is operated to perform a supplemental ignition to generate the hot plasma prior to a main ignition, and to perform the main ignition to ignite the mixture gas after the supplemental ignition, and
when the determination module determines the parameter is within the range, the spark plug is operated to perform only the main ignition to ignite the mixture gas.

8. The engine system of claim 7, wherein when the determination module determines that the parameter is below the first threshold, the spark plug operates at a first operation timing, and when the determination module determines that the parameter is above the second threshold, the spark plug operates at a second operation timing retarded from the first operation timing.

9. The engine system of claim 8,
wherein the ignition device detects the parameter at a timing between an opening of the intake valve and a closing of the intake valve, and
wherein the controller determines a flowing state of a swirl vortex inside the cylinder based on the parameter.

10. The engine system of claim 9, wherein the ignition device detects the parameter after a given time constant passes from the opening of the intake valve.

11. The engine system of claim 8,
wherein the ignition device detects the parameter after the closing of the intake valve, and
wherein the controller determines a flowing state of a tumble vortex inside the cylinder based on the parameter.

12. The engine system of claim 8, wherein the ignition device detects the parameter during the intake stroke and during the compression stroke.

13. The method of claim 1,
wherein the applying the high voltage includes detecting the parameter by the ignition device at a timing between an opening of the intake valve and a closing of the intake valve, and
wherein the determining whether the detected parameter is within the range includes determining by the controller a flowing state of a swirl vortex inside the cylinder based on the parameter.

14. The method of claim 1,
wherein the applying the high voltage includes detecting the parameter by the ignition device after the closing of the intake valve, and
wherein the determining whether the detected parameter is within the range includes determining by the controller a flowing state of a tumble vortex inside the cylinder based on the parameter.

15. The method of claim 1, wherein the applying the high voltage includes detecting the parameter by the ignition device during the intake stroke and during the compression stroke.

16. The engine system of claim 7,
wherein the ignition device detects the parameter at a timing between an opening of the intake valve and a closing of the intake valve, and
wherein the controller determines a flowing state of a swirl vortex inside the cylinder based on the parameter.

17. The engine system of claim 7,
wherein the ignition device detects the parameter after the closing of the intake valve, and
wherein the controller determines a flowing state of a tumble vortex inside the cylinder based on the parameter.

18. The engine system of claim 7, wherein the ignition device detects the parameter during the intake stroke and during the compression stroke.

19. An engine system, comprising:
an engine mounted on an automobile and including:
- a cylinder with a pentroof ceiling, air being introduced into the cylinder through an intake valve provided to the ceiling;
- an ignition device including a spark plug provided at or near the center axis of the cylinder; and
- a fuel injector provided at or near the center axis of the cylinder; and a controller electrically connected to the ignition device and the fuel injector, wherein the controller includes a processor configured to execute:
- a main fuel injection module to control the fuel injector to inject main fuel during one of an intake stroke and a compression stroke, and provide a mixture gas containing fuel and air inside the cylinder;
- a determination module to control the ignition device to apply a high voltage between electrodes of the spark plug at a timing when the mixture gas is not ignited, and detect a parameter related to a current value of an electric-discharge channel generated between the electrodes, and to determine whether the parameter detected by the ignition device is within a range between a first threshold and a second threshold to determine a flowing state of a vortex inside the cylinder;
- a supplemental ignition control module to control the ignition device to operate the spark plug to generate hot plasma; and
- a main ignition control module to control the ignition device to operate the spark plug to ignite the mixture gas, wherein when the determination module determines the parameter is outside the range, the spark plug is operated to perform a supplemental ignition to generate the hot plasma prior to a main ignition, and to perform the main ignition to ignite the mixture gas after the supplemental ignition, and when the determination module determines the parameter is within the range, the spark plug is operated to perform only the main ignition to ignite the mixture gas.

20. The engine system of claim 19, wherein the fuel of the engine is gasoline.

* * * * *